(12) United States Patent
Hwang et al.

(10) Patent No.: US 11,193,914 B2
(45) Date of Patent: Dec. 7, 2021

(54) PHOTOACOUSTIC PHOTON METER AND PROCESS FOR MEASURING PHOTON FLUENCE

(71) Applicant: Government of the United States of America, as represented by the Secretary of Commerce, Gaithersburg, MD (US)

(72) Inventors: Jeeseong Hwang, Louisville, CO (US); Christopher Yung, Louisville, CO (US); Kimberly Ann Briggman, Boulder, CO (US); John Henry Lehman, Boulder, CO (US)

(73) Assignee: GOVERNMENT OF THE UNITED STATES OF AMERICA, AS REPRESENTED BY THE SECRETARY OF COMMERCE, Gaithersburg, MD (US)

( * ) Notice: Subject to any disclaimer, the term of this patent is extended or adjusted under 35 U.S.C. 154(b) by 129 days.

(21) Appl. No.: 16/774,646

(22) Filed: Jan. 28, 2020

(65) Prior Publication Data
US 2020/0240957 A1 Jul. 30, 2020

Related U.S. Application Data

(60) Provisional application No. 62/798,104, filed on Jan. 29, 2019.

(51) Int. Cl.
*G01N 29/22* (2006.01)
*C01B 32/158* (2017.01)
*G01N 29/24* (2006.01)

(52) U.S. Cl.
CPC ....... *G01N 29/2418* (2013.01); *C01B 32/158* (2017.08); *G01N 29/221* (2013.01);
(Continued)

(58) Field of Classification Search
CPC ............ C01B 32/158; G01N 29/221; G01N 29/2418; G01N 2291/02872; G01N 2291/02881; G01N 2291/101
(Continued)

(56) References Cited

U.S. PATENT DOCUMENTS

| | | | |
|---|---|---|---|
| 8,811,631 B2 * | 8/2014 | Liu ..................... | H04R 23/002 381/164 |
| 8,946,683 B2 * | 2/2015 | Rogers ................. | B82Y 10/00 257/40 |

(Continued)

FOREIGN PATENT DOCUMENTS

EP 001909080 A1 * 4/2008 .............. G01J 1/42

*Primary Examiner* — Jacques M Saint Surin
(74) *Attorney, Agent, or Firm* — Office of Chief Counsel for National Institute of Standards and Technology

(57) ABSTRACT

A photoacoustic photon meter includes: a photoacoustic generative array including carbon nanotubes disposed in a photoacoustic generating pattern, such that the carbon nanotubes: receive photons comprising optical energy, and produce thermal energy from the optical energy; and a superstratum including a thermally expandable elastomer on which the photoacoustic generative array is fixedly disposed in position on the superstratum to spatially conserve the photoacoustic generating pattern, and such that the superstratum: is optically transparent to the photons; receives the thermal energy from the photoacoustic generative array; expands and contracts in response to receipt of the thermal energy; and produces photoacoustic pressure waves in response to the expansion and contraction, the photoacoustic pressure waves including a photoacoustic intensity and photoacoustic frequency that are based upon an amount of optical pressure applied to the carbon nanotubes by the photons, a spatial photon fluence of the photons, or a spectral photon fluence of photons.

20 Claims, 20 Drawing Sheets

(52) U.S. Cl.
CPC .............. *G01N 2291/02872* (2013.01); *G01N 2291/02881* (2013.01); *G01N 2291/101* (2013.01)

(58) Field of Classification Search
USPC .......................................................... 73/643
See application file for complete search history.

(56) References Cited

U.S. PATENT DOCUMENTS

| | | |
|---|---|---|
| 9,759,689 B2 | 9/2017 | Guo |
| 10,725,373 B1 * | 7/2020 | Kumar ................. G03F 7/0002 |

* cited by examiner

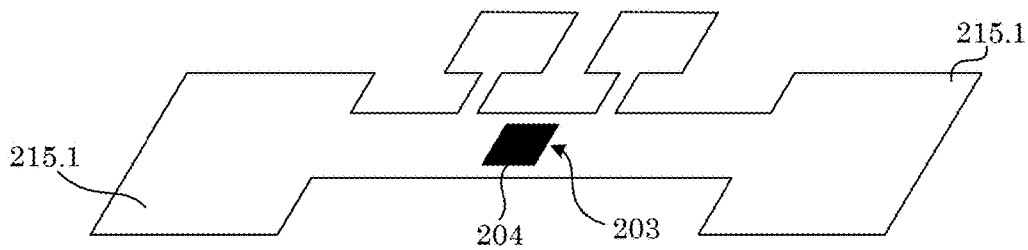
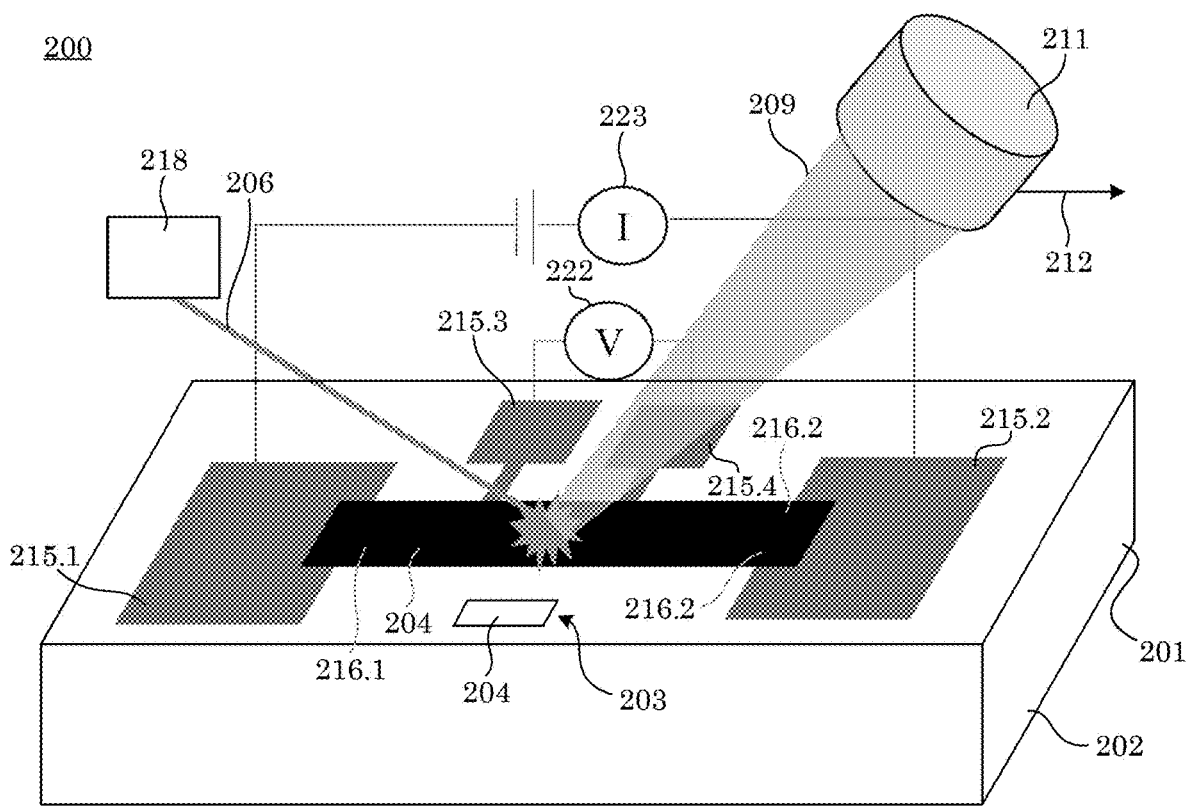
V: voltage between the inner probes
I: Current through the outer probes
$R(t) = \dfrac{V(t)}{I(t)}$ : electrical resistance
FIG. 10

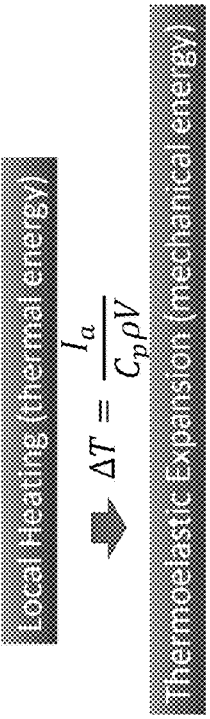
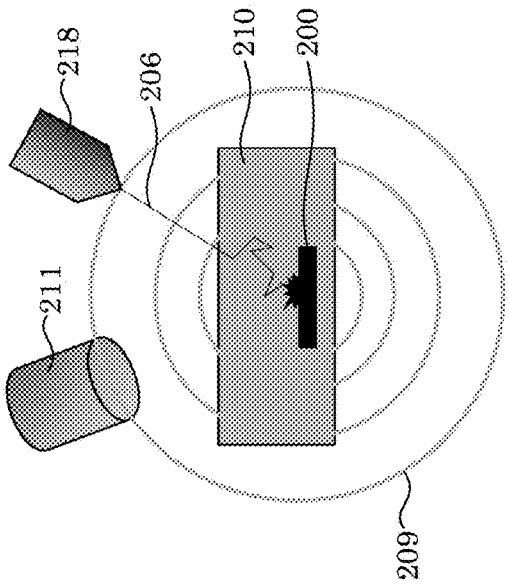
FIG. 16

PHOTOACOUSTIC PHOTON METER AND PROCESS FOR MEASURING PHOTON FLUENCE

CROSS REFERENCE TO RELATED APPLICATIONS

The application claims priority to U.S. Provisional Patent Application Ser. No. 62/798,104 filed Jan. 29, 2019, the disclosure of which is incorporated herein by reference in its entirety.

STATEMENT REGARDING FEDERALLY SPONSORED RESEARCH

This invention was made with United States Government support from the National Institute of Standards and Technology (NIST), an agency of the United States Department of Commerce. The Government has certain rights in the invention. Licensing inquiries may be directed to the Technology Partnerships Office, NIST, Gaithersburg, Md., 20899; voice (301) 301-975-2573; email tpo@nist.gov; reference Ser. No. 16/774,646.

BRIEF DESCRIPTION

Disclosed is a photoacoustic photon meter comprising: a photoacoustic generative array comprising a plurality of carbon nanotubes disposed in a photoacoustic generating pattern, such that the carbon nanotubes: receive photons comprising optical energy, and produce thermal energy from the optical energy; and a superstratum comprising a thermally expandable elastomer on which the photoacoustic generative array is fixedly disposed in position on the superstratum to spatially conserve the photoacoustic generating pattern, and such that the superstratum: is optically transparent to the photons; receives the thermal energy from the photoacoustic generative array; expands and contracts in response to receipt of the thermal energy; and produces photoacoustic pressure waves in response to the expansion and contraction, the photoacoustic pressure waves comprising a photoacoustic intensity and photoacoustic frequency that are based upon an amount of optical pressure applied to the carbon nanotubes by the photons, a spatial photon fluence of the photons, or a spectral photon fluence of the photons.

Disclosed is a process for measuring photon fluence with a photoacoustic photon meter, the process comprising: receiving photons by the carbon nanotubes in the photoacoustic generative array disposed on the superstratum; producing, by the carbon nanotubes, thermal energy from the optical energy of the photons; receiving, by the superstratum, the thermal energy from the photoacoustic generative array; expanding and contracting, by the superstratum, in response to receiving the thermal energy; and producing, by the superstratum, photoacoustic pressure waves in response to expanding and contracting of the superstratum to measure the photon fluence of the photons received by the photoacoustic photon meter, wherein the photoacoustic pressure waves comprise a photoacoustic intensity and photoacoustic frequency that are based upon an amount of optical pressure applied to the carbon nanotubes by the photons, a spatial photon fluence of the photons, or a spectral photon fluence of the photons.

Disclosed is a process for measuring a local temperature rise with a photoacoustic photon meter, the process comprising: receiving photons by the carbon nanotubes in the photoacoustic generative array deposited on a plurality of electrical conductors that is in thermal contact at the interface; increasing a temperature of the photoacoustic generative array upon receiving photons by the carbon nanotubes; measuring an electrical voltage across a first pair of electrical conductors of the plurality of electrical conductors while applying an electrical current across a second pair of electrical conductors of the plurality of electrical conductors; producing a current versus voltage curve from the electrical voltage and the electrical current; determining the electrical resistance from the current versus voltage curve; and obtaining the local temperature change from temperature-dependent electrical conductivity changes.

BRIEF DESCRIPTION OF THE DRAWINGS

The following description should not be considered limiting in any way. With reference to the accompanying drawings, like elements are numbered alike.

FIG. 10 shows a photoacoustic photon meter configured for measurement of electrical conductivity or resistance versus temperature of photoacoustic generative array of carbon nanotubes under photon fluence irradiation;

FIG. 16 shows a process for performing photoacoustic imaging with a photoacoustic photon meter;

DETAILED DESCRIPTION

Figure 1:
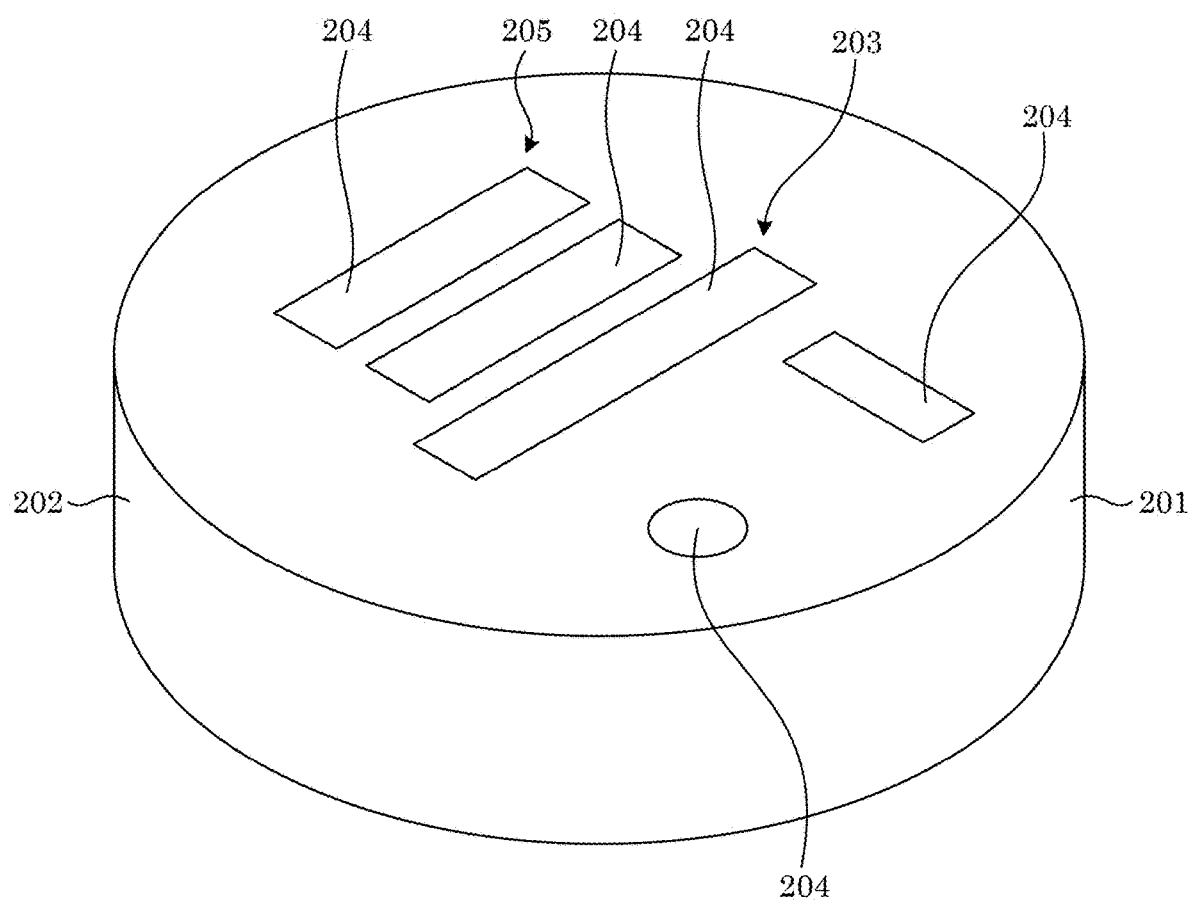
FIG. 1 shows a perspective view of a photoacoustic photon meter.
Figure 2:
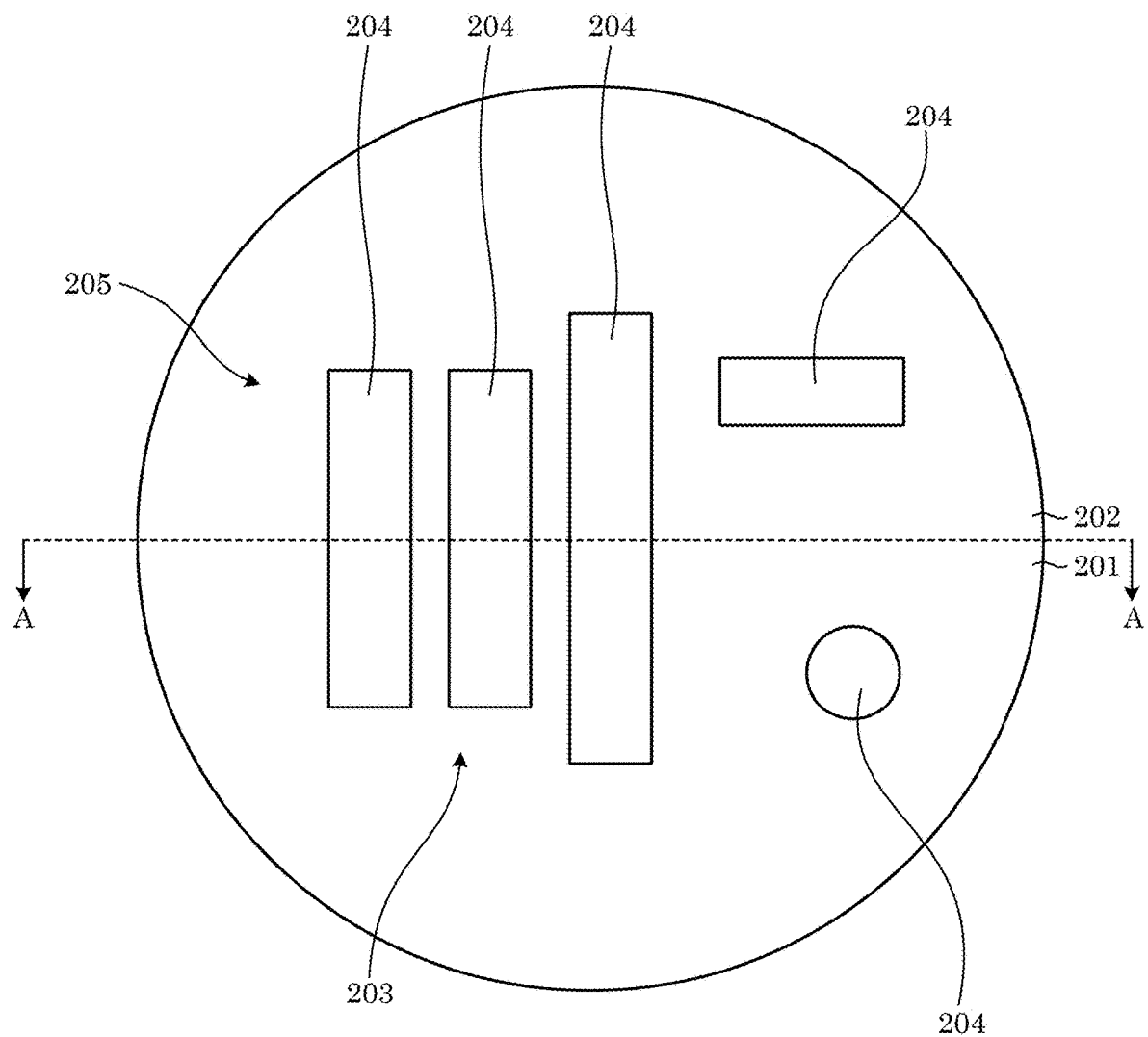
FIG. 2 shows a plan view of a photoacoustic photon meter.
Figure 3:
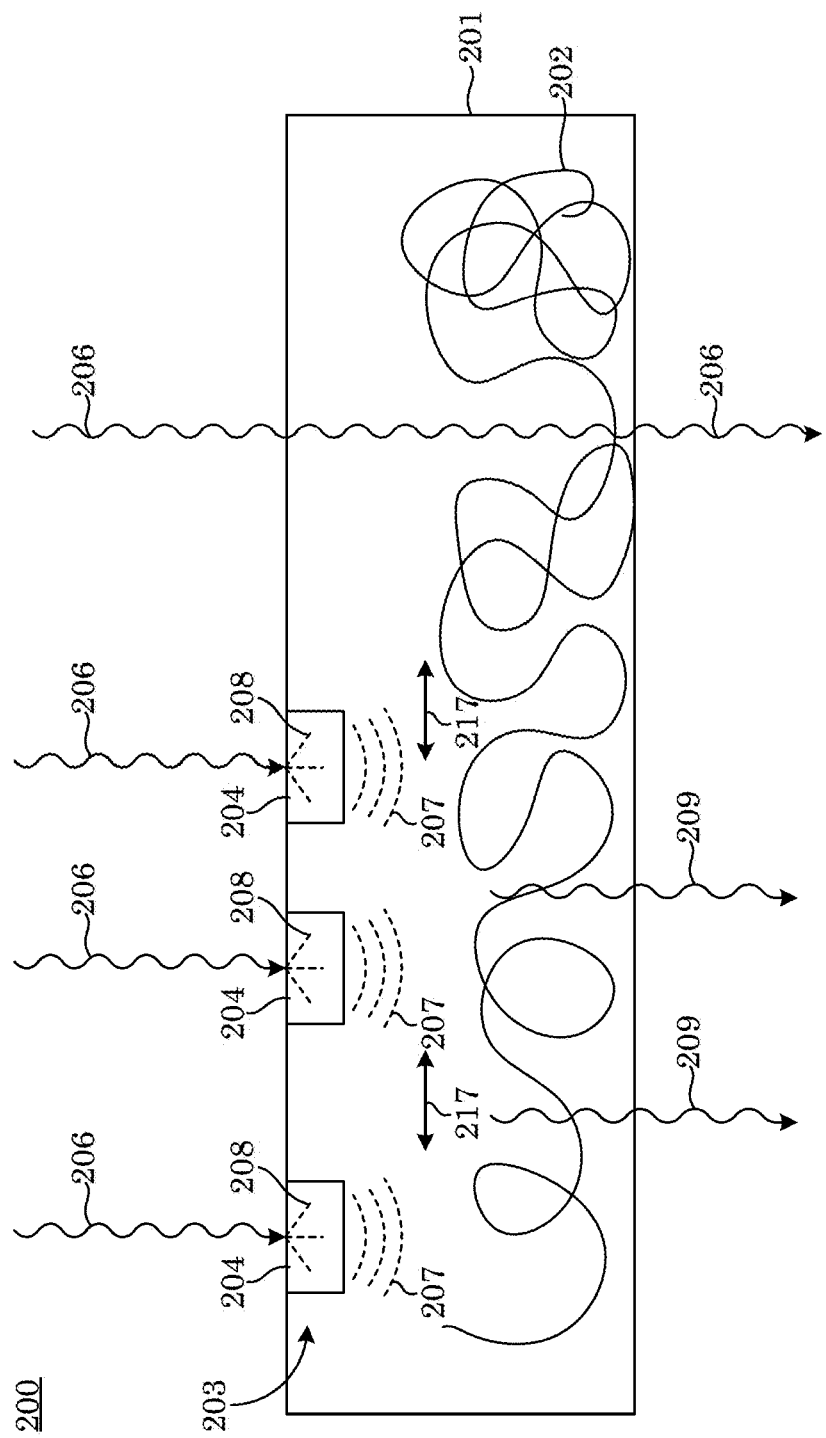
FIG. 3 shows a cross-section of the photoacoustic photon meter.

A detailed description of one or more embodiments is presented herein by way of exemplification and not limitation.

It has been discovered that photoacoustic photon meter disclosed herein measures a spatial photon fluence, spectral photon fluence, temperature, or pressure in a turbid medium. Photon fluence refers to irradiating photon energy per unit area or an irradiated number of photons per unit area. Spatial photon fluence refers to a spatial distribution of the photon fluence across a surface irradiated with photon. Spectral photon fluence refers to photon fluence per unit bandwidth of the wavelength of the irradiating light.

Advantageously, the photoacoustic photon meter overcomes technical limitations of conventional devices that fail, in a light-diffusing or light-absorbing material, to provide an accurate local photon fluence measurement with varied wavelength. Failure of such conventional devices can occur because a spatial distribution of light-scattering or light-absorbing entities disposed in a material may be non-uniform, and an enemy or propagating direction or depth of propagating photons in the material may not be spatially homogeneous and can be wavelength-dependent.

In the photoacoustic photon meter, carbon nanotubes (CNTs) can be arranged in a randomly distributed format or a systematically aligned or ordered format, wherein the CNTs absorb photons over a broad range of wavelengths and convert optical energy to thermal or mechanical energy that can be measured by a change in electrical conductivity of the CNTs or via ultrasound pressure created from thermal conversion by the CNTs of the absorption of the photons.

In an embodiment with reference to FIG. 1, FIG. 2, FIG. 3, and FIG. 4, photoacoustic photon meter 200 includes photoacoustic generative array 203 that includes a plurality of carbon nanotubes 204 disposed in photoacoustic generating pattern 205. Carbon nanotubes 204 receive photons 206 including optical energy 208 and produce thermal energy 207 from optical energy 208. Superstratum 201 includes thermally expandable elastomer 202 on which photoacoustic generative array 203 is fixedly disposed in position on superstratum 201 to spatially conserve photoacoustic generating pattern 205. Superstratum 201 is optically transparent to photons 206; receives thermal energy 207 from photoacoustic generative array 203; expands and contracts in response to receipt of thermal energy 207; and produces photoacoustic pressure waves 209 in response to expansion and contraction 217. Photoacoustic pressure waves 209 includes a photoacoustic intensity and photoacoustic frequency that are based upon an amount of optical energy applied to carbon nanotubes 204 by photons 206, a spatial photon fluence of photons 206, or a spectral photon fluence of photons 206.

Figure 4:
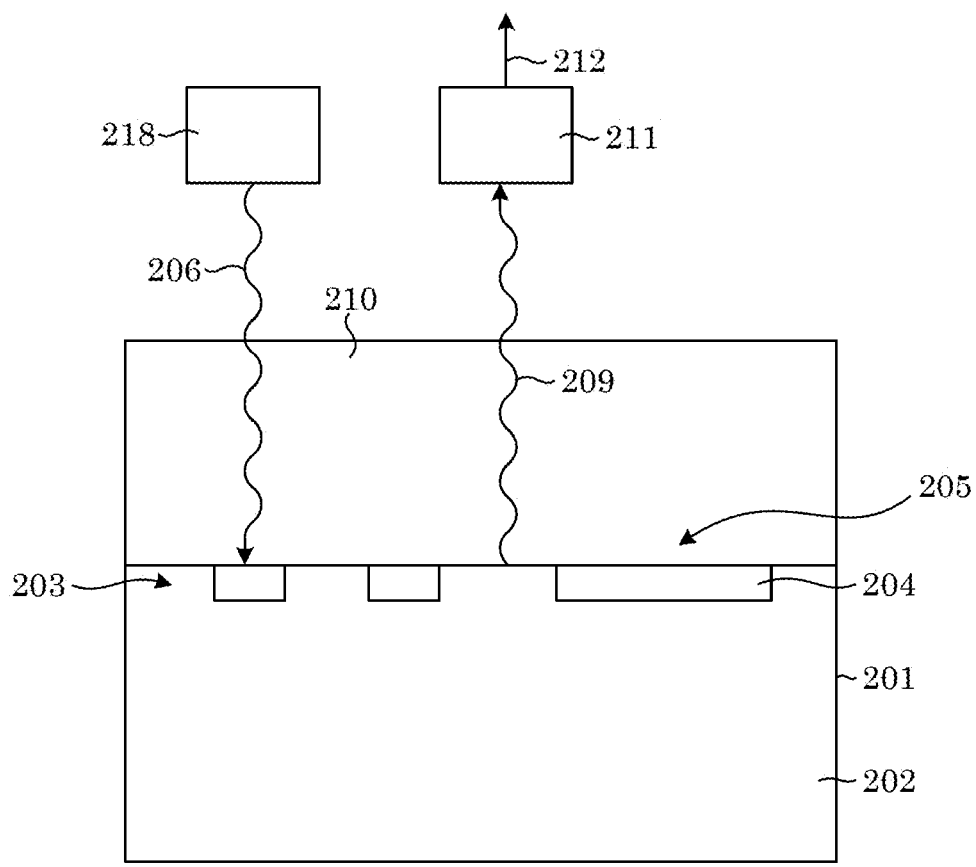
FIG. 4 shows a photoacoustic photon meter.

In an embodiment with reference to FIG. 4, photoacoustic photon meter 200 includes photon propagation medium 210 disposed on superstratum 201 and in photoacoustic communication with superstratum 201. Photon propagation medium 210 receives photoacoustic pressure waves 209 from superstratum 201; and communicates photoacoustic pressure waves 209 through photon propagation medium 210. Measuring photoacoustic pressure waves 209 by photoacoustic photon meter 200 can include configuring photoacoustic transducer 211 in photoacoustic communication with photon propagation medium 210 and superstratum 201. Photoacoustic transducer 211 receives the signal of photoacoustic pressure waves 209 from photon propagation medium 210; and produces electrical signal 212 from photoacoustic pressure waves 209 and from which the optical fluence of photons 206 can be determined.

Figure 5:
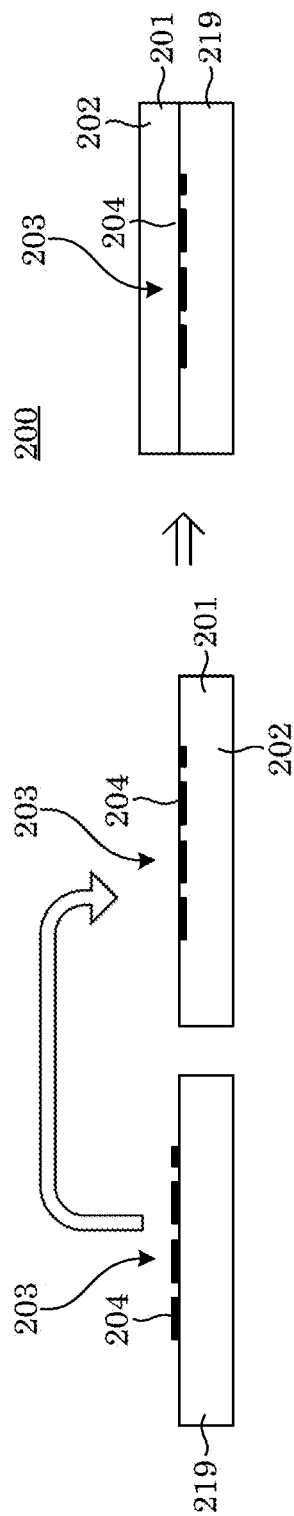
FIG. 5 shows a plurality of photoacoustic photon meters.

According to an embodiment, with reference to FIG. 5, photoacoustic photon meter 200 includes photoacoustic generative array 203 interposed between superstratum 201 and secondary substrate 219.

Figure 6:
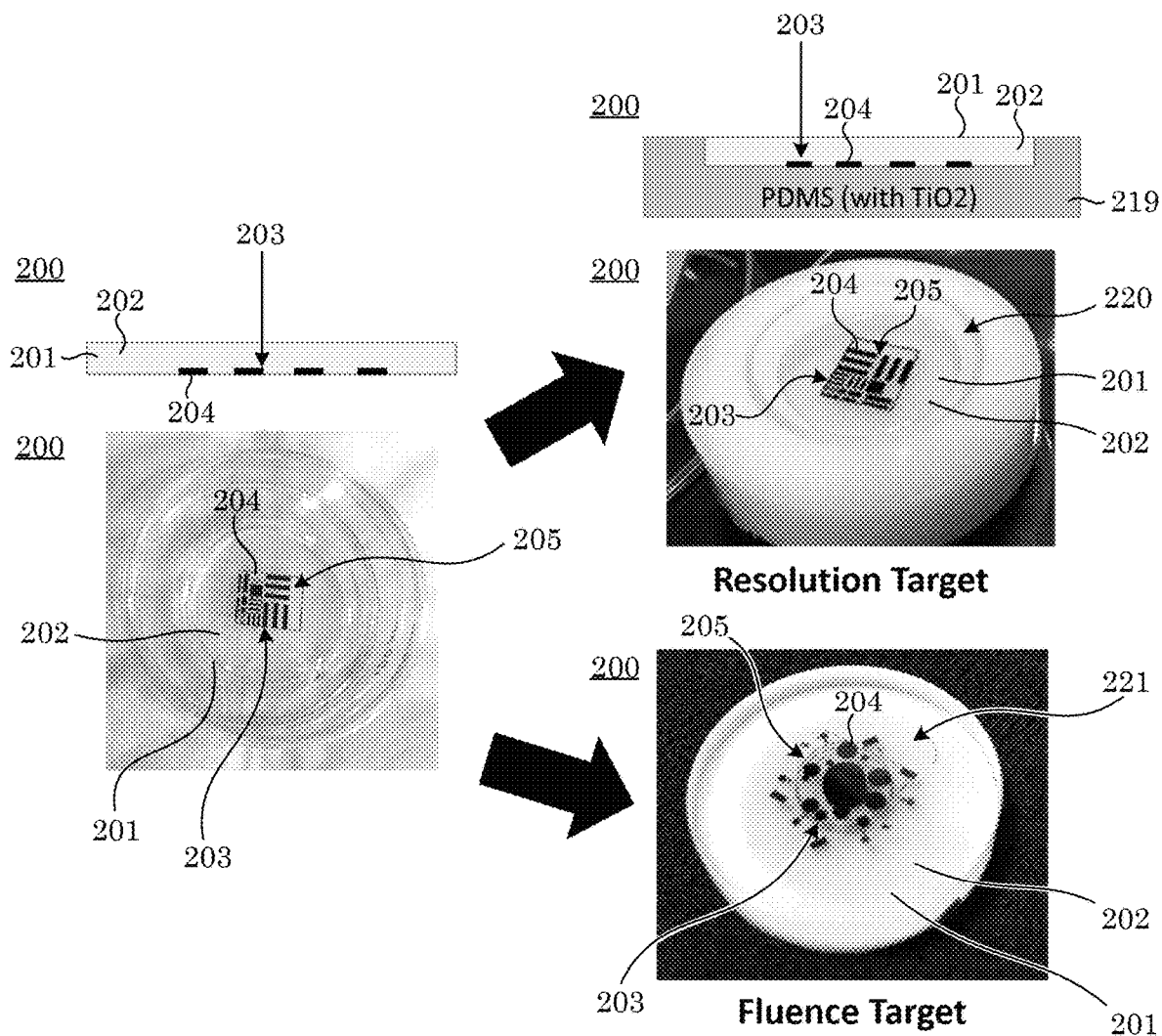
FIG. 6 shows a plurality of photoacoustic photon meters.
Figure 7:
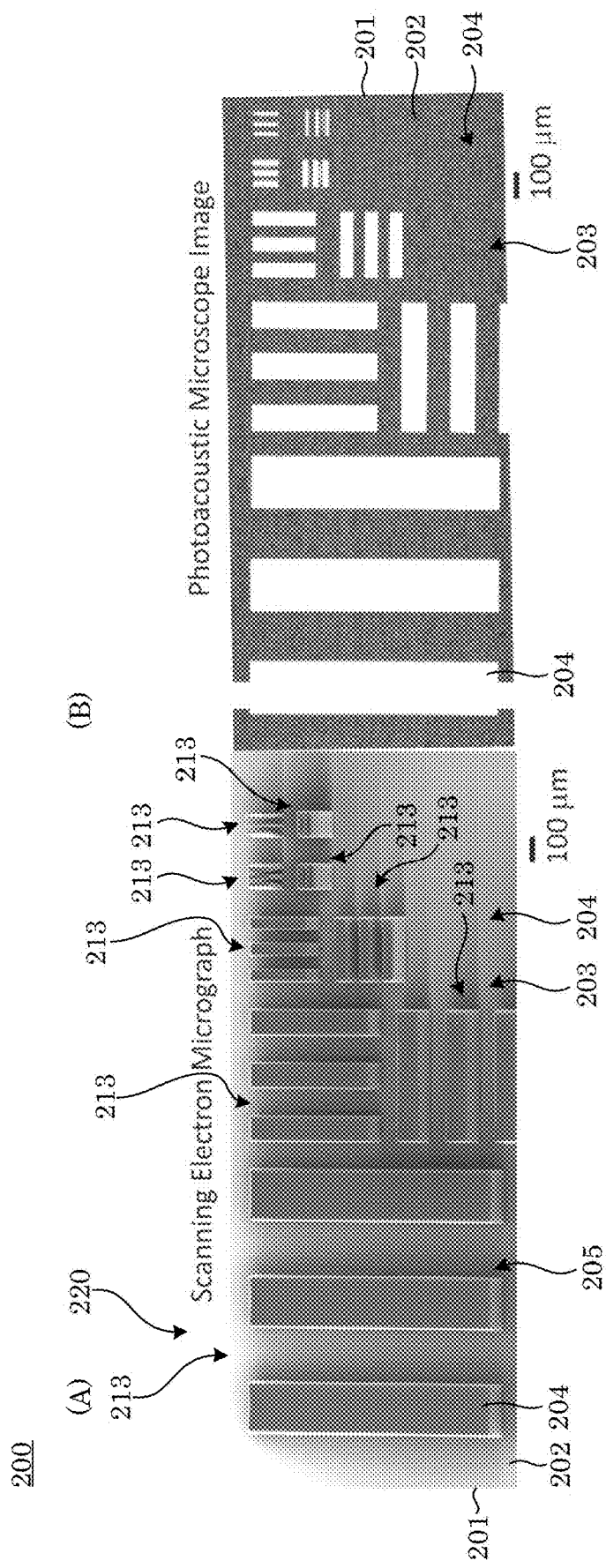
FIG. 7 shows a photoacoustic photon meter configured as a resolution target, wherein panel A shows a scanning electron micrograph of the photoacoustic photon meter array before transfer to a superstratum; and panel B shows a photoacoustic microscope image mapping photoacoustic pressure from the array that was detected by a photoacoustic transducer in the reflective position.

With reference to FIG. 6, photoacoustic photon meter 200 can be configured as resolution target 220 or fluence target 221. Photoacoustic photon meter 200 configured as a resolution target 220 that includes secondary substrate 219 for a light scattering material in which photoacoustic generative array 203 has carbon nanotubes 204 arranged in a photoacoustic generating pattern 205, wherein photoacoustic generating pattern 205 is discontinuous so that the photoacoustic generating pattern 205 includes a plurality of non-continuous pattern 213 as shown in FIG. 7.

Figure 8:
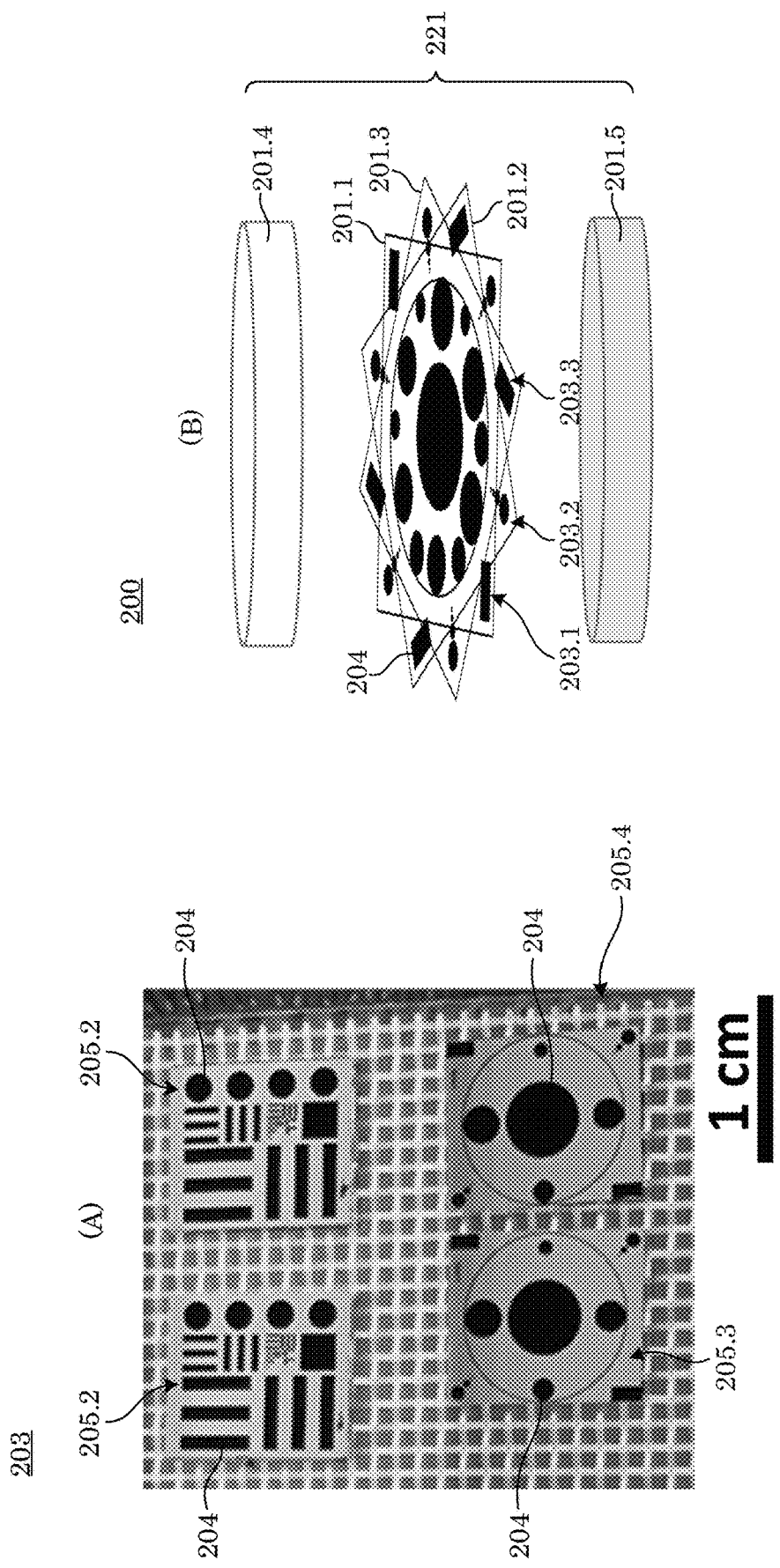
FIG. 8 panel A shows a plurality of photoacoustic generative arrays on a support substrate before transfer to a superstratum, and, in panel B, a partially expanded view of a photoacoustic photon meter configured as a fluence target that includes a plurality of superstrata with individual photoacoustic generative arrays and various photoacoustic generating patterns of carbon nanotubes.
Figure 9:
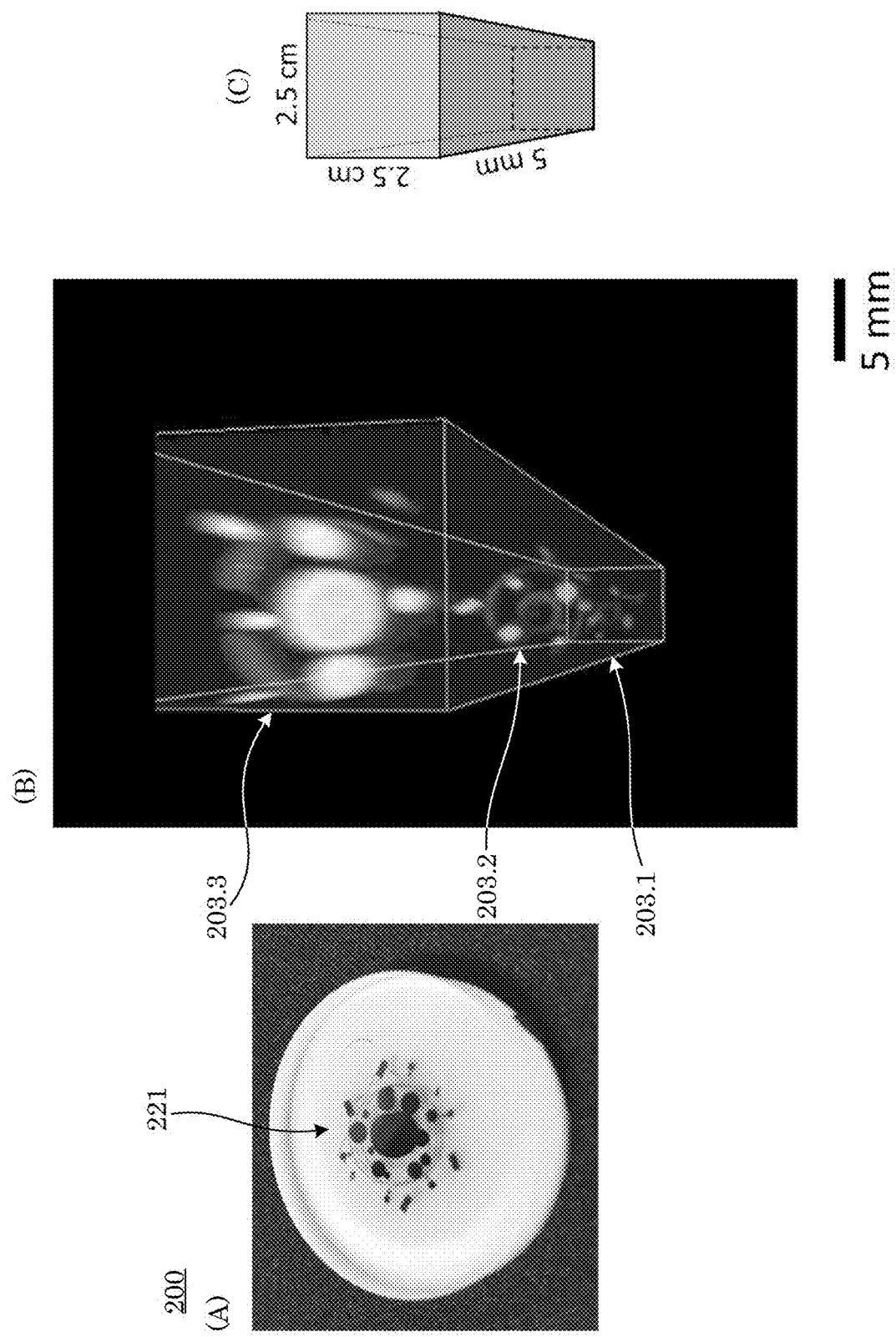
FIG. 9 shows a plurality of photoacoustic photon meters configured as a fluence target in panel A; in panel B, an image of the map of the photoacoustic pressure from the array, detected by a photoacoustic transducer in the reflective position; suggestive dimensions of the photon meters in panel C.

With reference to FIG. 8 and FIG. 9, photoacoustic photon meter 200 configured as a fluence target 221 includes a plurality of photoacoustic generative arrays 203 that include individual photoacoustic generating patterns 205. Here, each photoacoustic generative array 203 is individually disposed on a separate superstratum 201 (e.g., 201.1, 201.2, 201.3), wherein the superstrata (201.1, 201.2, 201.3) are stacked together to form layers of photoacoustic generating pattern 205 (205.1, 205.2, 205.3). Here, first superstratum 201.1 and first photoacoustic generative array 203.1 are stackedly disposed on second superstratum 201.2 and second photoacoustic generative array 203.2 that is stackedly disposed on third superstratum 201.3 and third photoacoustic generative array 203.3. Although three stacked photoacoustic generating pattern (205.1, 205.2, 205.3) are shown in FIG. 8 and FIG. 9, a number of stacked layers of photoacoustic generative arrays 203 disposed on superstratum 201 is arbitrary and can be selected to obtain a selective fluence target design. Further, photoacoustic photon meter 200 can include additional layers of superstratum 201 (e.g., 201.4, 201.5).

In an embodiment, with reference to FIG. 10, photoacoustic photon meter 200 includes a pattern of a thin film of an electrical conductor 215.1 and 215.2 with disposed photoacoustic generative array 203 in contact with its top. Additional electrical conductors 215 (e.g., 215.3, 215.4) can be included in photoacoustic photon meter 200. In this manner, photoacoustic photon meter 200 can be configured for measuring an electrical resistance across the electrode with the photoacoustic generative array 203 on top. Here, voltage meter 222 can be connected to third electrical conductor 215.3 and fourth electrical conductor 215.4, and current source 223 can be connected to one end of first electrical conductor 215.1 and the other end of second electrical conductor 215.2 so that photoacoustic generative array 203 can be subjected to photons 206, e.g., from light source 218 in response to which superstratum 201 produces photoacoustic pressure waves 209 that are received by photoacoustic transducer 211. In response to receipt of photoacoustic pressure waves 209, photoacoustic transducer 211 produces electrical signal 212 that is used to determine photon fluence of photons 206 from light source 218. Moreover, electrical resistance of photoacoustic generative array 203 can be obtained by measuring an electrical voltage while applying an electrical current across electrical conductors 215.1 and 215.2, the electrical resistance can be calculated from the current versus voltage curve then the local temperature change information can be obtained from the temperature dependent electrical resistance change.

Figure 12:
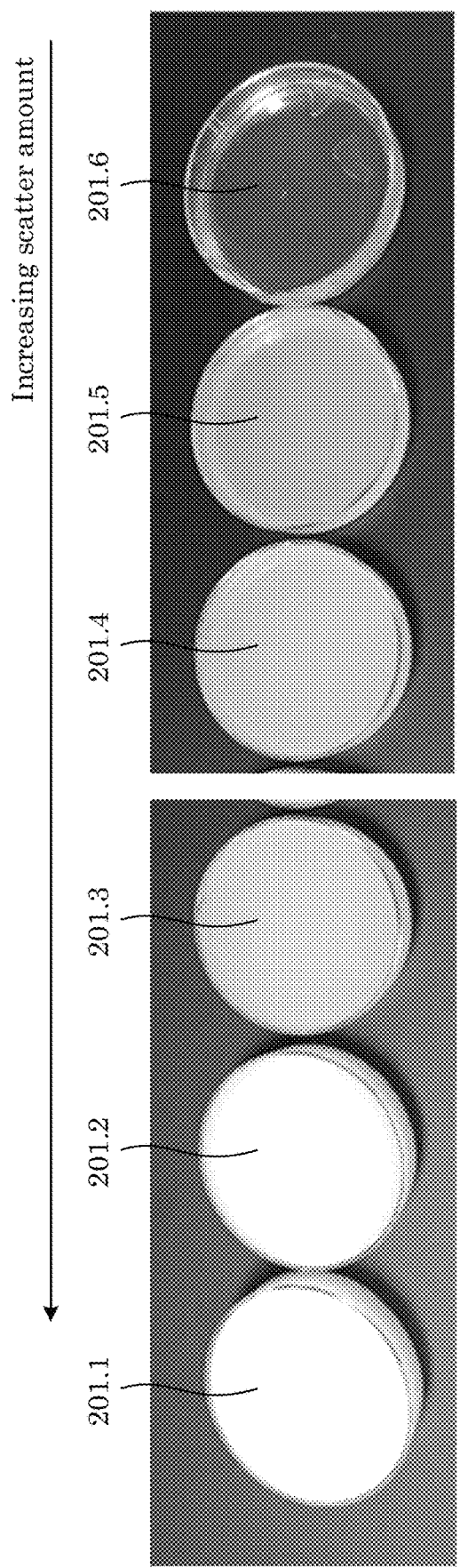
FIG. 12 shows a plurality of superstrata with tunable optical properties, such as light absorption and/or scattering properties, for disposition of carbon nanotubes in a photoacoustic generative array in a photoacoustic photon meter.

Photoacoustic photon meter 200 includes superstratum 201 on which photoacoustic generative array 203 is formed or disposed. Superstratum 201 can include elastomeric polymers including poly(dimethylsulfoxide) (PDMS), poly(vinyl chloride) plastisol (PVCP), poly-methyl-methacrylate, polystyrene, polyethylene, high-density polyethylene (HDPE), medium-density polyethylene, low-density polyethylene, and ultrahigh molecular weight polyethylene to absorb full or partial irradiated photon energy and to convert absorbed photon energy into heat and then to induce mechanical expansion and contraction thereof. Superstratum 201 can include an elastomeric polymer as a base material and additives disposed in the base material. Exemplary superstrata 201 include thermally expandable elastomer 202 such as PDMS with a high thermal expansion coefficient for effective conversion of heat energy into mechanical energy for expansion and contraction of the material to effectively generate photoacoustic pressure waves. A thickness of superstratum 201 can be from 100 nm to 10 cm. The Young's modulus and thermal expansion coefficient of superstratum 201 can be from 1000 kPa to 10000 kPa and from $1\times10^{-4}$ $K^{-1}$ to $1\times10^{-2}$ $K^{-1}$, respectively. Accordingly, superstratum 201 can expand and contract in response to thermally expandable elastomer 202 being heated either locally or globally. The specific heat capacity of superstratum 201 can be from 1000 J $kg^{-1}K^{-1}$ to 10000 J $kg^{-1}K^{-1}$. In an embodiment, superstratum 201 includes elastomeric polymer PDMS with or without additives such as titanium dioxide nano- and micro-particles and microbeads such as polystyrene beads or silica beads. It is contemplated that superstratum 201 can be a composition that includes additives in the elastomer. Such additives include light scattering and absorbing nano- and micro-particles such as titanium dioxide nanoparticles, polystyrene micro beads, silica micro beads, metal and semiconductor nanoparticles, carbon particles and spheres, carbon nanotubes, and pigment proteins such as hemoglobin, cytochrome C, and myoglobin. Such additives with controlled concentration provide controlled light absorption and scattering properties. FIG. 12 shows a plurality of superstrata (201.1, 201.2, . . . , 201.6) that include thermally expandable elastomer 202 and varying amounts of an additive that change an optical transparency of superstratum 201 through optical attenuation at a selected wavelength or optical fluence.

Superstratum 201 can be formed from liquid composition 226. Liquid composition 226 can include thermally expandable elastomer 202 as well as light scattering and absorbing additives, solvent, and the like nano- and micro-particles such as titanium dioxide nanoparticles, polystyrene micro beads, silica micro beads, metal and semiconductor nanoparticles, carbon particles and spheres, carbon nanotubes, and pigment proteins such as hemoglobin, cytochrome C, and myoglobin to control light scattering and absorbing properties, other optical properties, photothermal properties, and mechanical properties. Liquid composition 226 can be subjected to curing by heating to form a gel or solid superstratum 201. It is contemplated that during formation of superstratum 201 or thereafter thermally expandable elastomer 202 can be crosslinked selectively to obtain an amount of crosslinking in the elastomer of thermally expandable elastomer 202 to provide a desired expansion and contraction property such as rigidity, thermal expansion rate, and the like. In an embodiment, solvents for liquid composition 226 can include diisopropylamine, chloroform, tetrahydrofuran, hexanes, cyclohexane, toluene, benzene, chlorobenzene, methylene chloride, t-butyl alcohol, methanol, and ethanol. In an embodiment, diisopropylamine is the solvent and initiates cross linking.

Secondary substrate 219 can include an identical base material as included in superstratum 201 and identical additives to control light scattering and absorbing properties, other optical properties, photothermal properties, and mechanical properties and can be an additional substrate to encapsulate photoacoustic generative array 203 or adjust optical attenuation properties in the irradiation beam path of photoacoustic photon meter 200. Optical attenuation can include absorption of photons 206 or scattering of photons 206. In this respect, in FIG. 15, exemplary secondary substrates 219 can include thermally expandable elastomer 202, light attenuator 227 (e.g., an absorber, a scatterer, and the like), optical matrix 228, or the like. A thickness of secondary substrate 219 can be from 100 nm to 10 cm. The Young's modulus and thermal expansion coefficient of secondary substrate 219 can be from 1000 kPa to 10000 kPa and from $1 \times 10^{-4}$ $K^{-1}$ to $1 \times 10^{-2}$ $K^{-1}$, respectively. Accordingly, secondary substrate 219 can expand and contract in response to thermally expandable elastomer 202 being heated either locally or globally. The specific heat capacity of secondary substrate 219 can be from 1000 J $kg^{-1}K^{-1}$ to 10000 J $kg^{-1}K^{-1}$. In an embodiment, secondary substrate 219 includes elastomeric polymers including PDMS, PVCP, poly-methyl-methacrylate, polystyrene, polyethylene, high-density polyethylene (HDPE), medium-density polyethylene, low-density polyethylene, and ultrahigh molecular weight polyethylene and not limited to these listed elastomeric polymeric materials. PDMS, PVCP or HDPE can be the base material. It is contemplated that secondary substrate 219 can be a composition that includes additives in the elastomer. Such light scattering and absorbing additives include nano- and micro-particles such as titanium dioxide nanoparticles, polystyrene micro beads, silica micro beads, metal and semiconductor nanoparticles, carbon particles and spheres, carbon nanotubes, and pigment proteins such as hemoglobin, cytochrome C, and myoglobin. Such additives with controlled concentration provide controlled light absorption and scattering properties.

Photoacoustic generative array 203 can be formed on support substrate 224 before transferring photoacoustic generative array 203 to superstratum 201 from support substrate 224 to form photoacoustic photon meter 200. Support substrate 224 can include a flat or curved solid or gel material onto which carbon nanotubes in sub-micrometer or micrometer scale patterns can be grown or deposited including materials such as silicon, quartz, calcium fluoride, magnesium fluoride, glass, Teflon, glass coated with metals including indium tin oxide, gold, aluminum, titanium, elastomeric polymers. Exemplary support substrates 224 include a silicon wafer, polished metal substrate, optical flat window, and the like. Moreover, support substrate 224 have stable thermal and chemical properties to enable photolithography or electron beam lithography patterning of carbon nanotubes catalyst and subsequent growth of carbon nanotubes by chemical vapor deposition technique. A thickness of support substrate 224 can be from 100 micrometer to 1 centimeter. The Young's modulus of support substrate 224 can be from 10 GPa to 200 GPa. In an embodiment, support substrate 224 includes silicon wafer, quartz, magnesium fluoride, and calcium fluoride substrates.

Carbon nanotubes 204 can include multi wall, single wall, metallic, semiconductor carbon nanotubes of one or more of these types that can have different electrical, mechanical, thermal, or optical properties including electrical conductivity, peak absorption wavelength, specific heat capacity, light absorption and scattering properties. Carbon nanotubes 204 can be vertically grown by chemical vapor deposition, homogenously dispersed carbon nanotubes in elastomeric polymer, or carbon nanotubes transferred from a water surface to a solid substrate. Exemplary carbon nanotubes 204 include metallic single wall, metallic multiwall, semiconductor single wall, semiconductor multiwall carbon nanotubes and the like. An aspect ratio of individual carbon nanotubes 204 can be from 10 to 1000000, specifically from 100 to 2000. Carbon nanotubes 204 can be modified to include a substitute atom in the body of the carbon nanotube, such that a substitute atom replaces a carbon atom in the body of the carbon nanotube. Exemplary substitute atoms include boron, nitrogen, silicon, and the like. Carbon nanotubes 204 can include a functional group attached to an atom, e.g., a carbon atom or substitute atom. Exemplary functional groups include carboxyl, amine, hydroxyl, and the like. In an embodiment, carbon nanotubes 204 includes metallic multiwalled carbon nanotubes vertically grown on a silicon substrate by chemical vapor deposition or photography patterning.

Carbon nanotubes 204 are disposed in photoacoustic generative array 203 and arranged in photoacoustic generating pattern 205 that produces spatially selective heating of superstratum 201 over a desired period of time. Photoacoustic generating pattern 205 includes a shape formatted to selectively create photoacoustic pressure waves 209 from specific regions of superstratum 201. Exemplary shapes of photoacoustic generating pattern 205 are relative to a surface of superstratum 201 on which carbon nanotubes 204 are disposed in desired patterns including linear, round, spiral, interdigitated, polygonal, and the like. Photoacoustic generating pattern 205 can be discontinuous such that gaps occur between adjacent patterns of carbon nanotubes 204 with a plurality of non-contacting portions 213 of carbon nanotubes 204 (see, e.g., FIG. 7) or can be continuous (see, e.g., FIG. 19A) so that adjacent patterns or portions of carbon nanotubes 204 are in physical contact. Photoacoustic generating pattern 205 can be continuous in an absence of a discontinuity among carbon nanotubes 204. A pitch, i.e., a distance of separation, between adjacent parts of photoacoustic generative array 203 can be selected to achieve thermal heating rate or thermal heating area of superstratum 201 in response to receipt of photons 206 by carbon nanotubes 204. The pitch can be from 100 nanometers to 10 millimeters.

It is contemplated that photoacoustic generative array 203 can include a plurality of photoacoustic generating patterns 205, e.g., as shown in FIG. 7. Further, photoacoustic generative array 203 can include a plurality of different types of carbon nanotubes 204, including a combination of modified carbon nanotubes (e.g., including a substitute atom or functional group), aspect ratios, and the like. It is contemplated that carbon nanotubes 204 in photoacoustic generative array 203 can be aligned with respect to each other so that carbon nanotubes 204 are aligned at a selected angle with respect to the surface of superstratum 201 on which photoacoustic generative array 203 is disposed to provide, e.g., vertically aligned or bundled carbon nanotubes and the like. Carbon nanotubes 204 can be randomly arranged with respect to each other. Moreover, carbon nanotubes 204 in the photoacoustic generating pattern 205 can be arranged spatially and provide different portions of photoacoustic generating pattern 205 to have a different optical absorption coefficient $\mu_a$ and reduced scattering coefficient $\mu_s'$. After patterning, the carbon nanotubes can be exposed to a gas plasma to make the carbon nanotubes bundled; such processing changes optical properties of the carbon nanotubes such as absorption and scattering or reduced scattering coefficients.

Light source 218 produces photons 206. Light source 218 can include a pulsed laser, intensity modulated continuous laser, pulsed light emitting diode, intensity modulated light emitting diode, and frequency comb laser that produces photons 206 having a wavelength from ultraviolet to mid infrared to provide optical energy to carbon nanotubes 204 that absorb light and convert light energy into heat that is subsequently converted to photoacoustic pressure. Light source 218 can include light delivery or light modification components such as an optical fiber, lens, frequency doubler, frequency tripler, frequency quadrupler, and the like. Exemplary light sources 218 include a nanosecond pulsed laser diode, optical parametric oscillator nanosecond laser, dual comb mode-lock frequency comb laser, and the like. It is contemplated that light source 218 can be pulsed at a repetition frequency from 1 Hz to 100 MHz, typically from 10 Hz to 100 kHz, with a pulse width from 1 fs to 1 ms, specifically from 1 ns to 100 ns. Photons 206 can have a wavelength from ultraviolet to mid-infrared, specifically from 266 nm to 5000 nm. An energy of photons 206 can be from 1 pJ to 100 mJ, specifically from 1 nJ to 1 µJ. An optical fluence of photons 206 can be from 0.001 to 1 times the ANSI limit (100 mJ/cm$^2$ at 520 nm), specifically from 0.1 mJ/cm$^2$ to 100 mJ/cm$^2$, wherein the ANSI limit varies as a function of wavelength of light. In an embodiment, photons 206 have a wavelength of 520 nm, a fluence of 50.9 mJ/cm$^2$, a repetition rate of 10 kHz, and a pulse width of 4 ns.

Carbon nanotubes 204 disposed on superstratum 201 receive photons 206, e.g., from light source 218. Optical energy 208 of photons 206 can be from 1 pJ to 1 µJ, specifically from 1 nJ to 100 nJ. Carbon nanotubes 204 in photoacoustic generative array 203 convert optical energy 208 to thermal energy 207 that is communicated to superstratum 201. Thermal energy 207 can be expressed by 1−exp(−thickness×absorption coefficient).

Superstratum 201 receives thermal energy 207 from photoacoustic generative array 203 and converts thermal energy 207 to photoacoustic pressure waves 209 by repeated heating leading to expansion of thermally expandable elastomer 202 when photoacoustic generative array 203 receives photons 206 and rapidly accumulates optical energy before heat dissipation during the irradiation of photons 206 by photoacoustic generative array 203 so that almost no thermal energy 207 is communicated from photoacoustic generative array 203 to superstratum 201 during the pulse duration time by a pulsed laser. The rapidly accumulated thermal energy induced mechanical expansion and contraction of the photoacoustic generative array 203 to generate photoacoustic pressure in the photoacoustic generative array 203 generates local pressure transferred to superstratum 201. Photoacoustic pressure waves 209 have a photoacoustic intensity and photoacoustic frequency. The photoacoustic intensity can be from 1 kPa to 1 GPa. The photoacoustic frequency is in the ultrasound frequency range and can be from 10 kHz to several GHz.

Photon propagation medium 210 can receive photoacoustic pressure waves 209 from superstratum 201. Photon propagation medium 210 can include gas, liquid, gel, or solid to receive the acoustic pressure energy either directly from the photoacoustic generative array 203 or from the superstratum in contact with the photoacoustic generative array 203 and convert the energy into propagating pressure wave and can be water, single or multi-element gas, a gel-like material such as hydrogel, or solid materials such as metal and ceramic. Exemplary propagation media 210 includes water, NO$_2$ trace gas, and the like. It is contemplated that photon propagation medium 210 can have a viscosity from 10 µPa·s (gas) to 1 mPa·s (water) for gas and liquid, about 1 mPa·s for water at room temperature. Photon propagation medium 210 can have a frequency and temperature dependent transmission efficiency with an absorption of 1 dB/km of a 10 kHz sound wave at room temperature in water. In an embodiment, photon propagation medium 210 includes water.

Photoacoustic pressure waves 209 propagate through photon propagation medium 210, and photoacoustic transducer 211 can receive photoacoustic pressure waves 209 from photon propagation medium 210. Photoacoustic transducer 211 can include ultrasound transducers, including a surface material in contact with the photon propagation medium 210 in one end and the other with an element to convert sensed pressure signal to an electrical or optical signal and can be a piezoelectric pressure sensor, Fabry-Perot optical cavity sensor, metamaterial sensor, or other hybrid sensor of such types. Exemplary photoacoustic transducers 211 include a hydrophone, optical cavity sensor, microcantilever sensor, and the like.

Photoacoustic transducer 211 produces electrical signal 212 from receipt of photoacoustic pressure waves 209. Electrical signal 212 can include an intensity, pulse width, time delay from the beginning time of the laser irradiation, and frequency spectrum to measure the pressure wave characteristics in the photon propagation medium 210, reflecting the acoustic pressure characteristics generated from the photoacoustic generative array 203 and can be a time-traced voltage signal. Exemplary electrical signal 212 include peak-to-peak amplitude of the propagating pressure wave packet, pulse width of the wave packet, and the delay time from the beginning time of the laser irradiation, and the like. The photoacoustic intensity can be from 1 kPa to 1 GPa. The photoacoustic frequency is in the ultrasound frequency range and can be from 10 kHz to several GHz. The amplitude is the peak-to-peak distance in volts measured from the propagating wave packet of the pressure wave measured by a photoacoustic transducer. In an embodiment, photoacoustic transducer 211 includes a focusing piezoelectric transducer with a 50 MHz center detection frequency and with a frontal end with about 6 mm in diameter.

It is contemplated that the optical fluence of photons 206 is determined from electrical signal 212 measured by an photoacoustic transducer 211 or from electrical signal measured by a photodetector 214. The optical fluence can include a spatial photon fluence of photons 206 or a spectral photon fluence of the photons 206. The spatial photon fluence is a distribution of optical fluence as received over photoacoustic generative array 203. The distribution can be uniform or non-uniform across photoacoustic generative array 203 so that an amount of optical energy irradiated onto the carbon nanotubes 204 by the photons 206 across photoacoustic generative array 203 can be the same for a uniform distribution of spatial photon fluence or can be different for a non-uniform distribution of spatial photon fluence. In this respect, a spectral photon fluence can be spatially uniform or non-uniform, e.g., having a Gaussian distribution in space. A spectral photon fluence can also be of some intensity distribution across the wavelength range, based on a distribution of wavelengths of photons 206.

Figure 19:
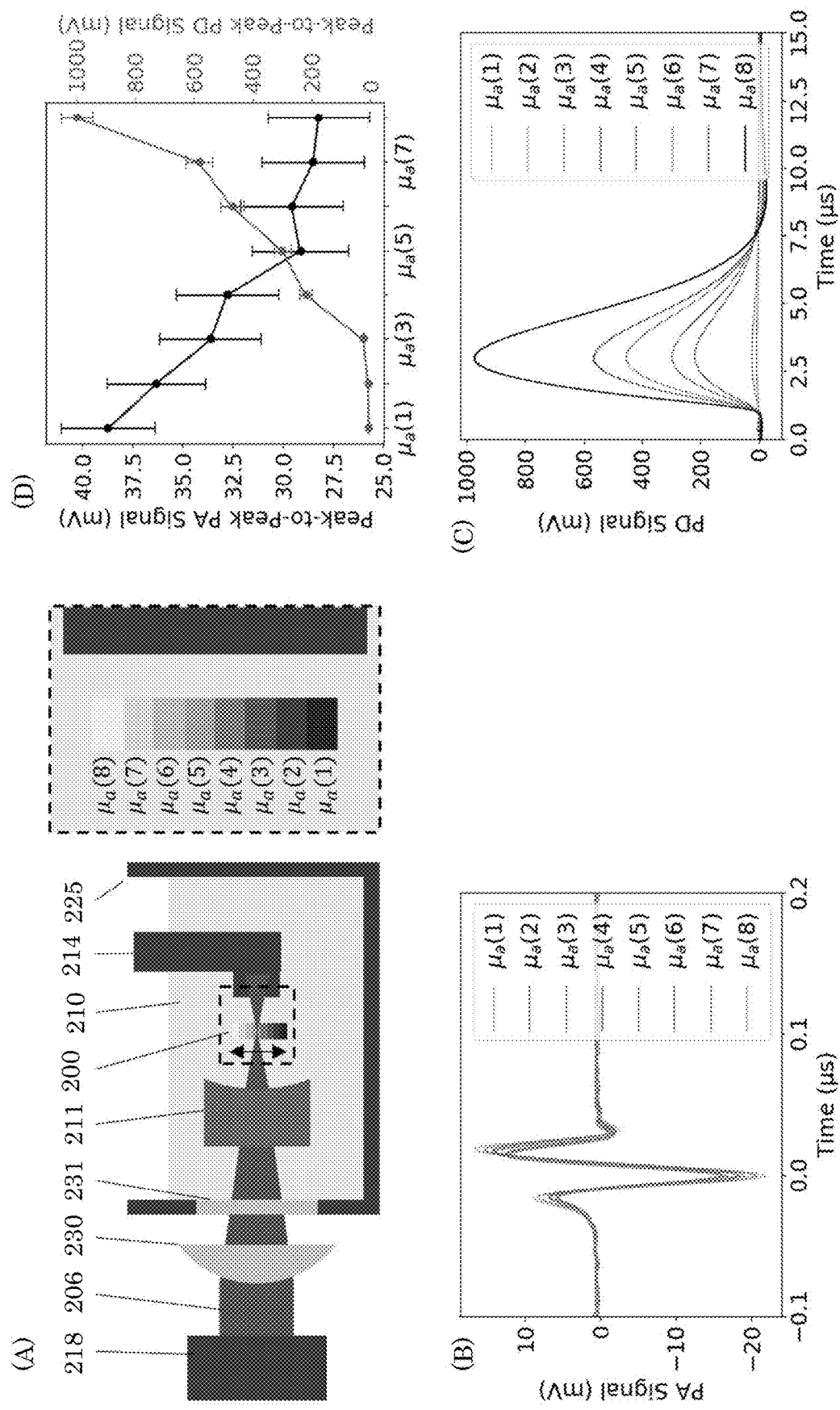
FIG. 19 shows a process of simultaneously measuring the photoacoustic pressure and photon fluence by a photoacoustic photon meter including a carbon nanotube array where the array has multiple connected carbon nanotube patches with varied absorption coefficients in panel A; a graph of photoacoustic signal versus time in panel B from different portions of the photoacoustic photon meter measured by a photoacoustic transducer shown in panel A; a graph of photodetector signal versus time from different portions of the photoacoustic photon meter shown in panel C; and a graph of photoacoustic pressure and photodetector signals from different portions of the photoacoustic photon meter simultaneously measured by an ultrasound sensor and a photodetector shown in panel D.

In an embodiment, e.g., as shown in FIG. 19, photodetector 214 is in optical communication with photoacoustic generative array 203 and superstratum 201 and receives photons 206 transmitted through photoacoustic generative array 203 and superstratum 201. Photoacoustic transducer 211 produces electrical signal 212 from receipt of photoacoustic pressure waves 209. Electrical signal 212 can include intensity, pulse width, time delay from the beginning time of the laser irradiation, and frequency spectrum to measure the pressure wave characteristics in the photon propagation medium 210, reflecting the acoustic pressure characteristics generated from the photoacoustic generative array 203. Exemplary electrical signals 212 include peak-to-peak amplitude of the propagating pressure wave packet, pulse width of the wave packet, and the delay time between the pulse irradiation time and the signal arrival time, and the like.

According to an embodiment, e.g., as shown in FIG. 10 and FIG. 19, photoacoustic photon meter 200 includes electrical conductor 215 with photoacoustic generative array 203 in contact with electrical conductor 215 to provide thermal energy from photoacoustic generative array 203 to electrical conductor 215 upon light irradiation onto photoacoustic generative array 203. Electrical conductor 215 can include photo lithographically patterned thin metal or metal oxide films to measure an electrical conductivity across the electrode with photoacoustic generative array 203 on top while irradiating a pulsed light onto photoacoustic generative array 203 and can be a thin film gold, silver, tungsten, titanium, indium tin oxide, silicon nitride, or silicon oxide. Exemplary electrical conductors 215 include a thin firm of indium tin oxide, tungsten, titanium oxide and the like. In an embodiment, electrical conductor 215 includes a tungsten thin film.

Electrical conductor 215 can be in contact with photoacoustic generative array 203 on its top for electrical equipment or circuitry to provide electrical measurement of electrical conductance or resistance change across electrical conductor 215 when photoacoustic generative array 203 is irradiated by a pulsed laser increasing local temperature of electrical conductor 215, while current is supplied across the electrical conductor 215. Electrical equipment includes voltage meter 222 to measure voltage across electrical conductor 215, current source 223 to provide electrical current to electrical conductor 215 with photoacoustic generative array 203 on its top. Electrical resistance of photoacoustic generative array 203 can be determined with such devices configured as shown in FIG. 10. Here, when photons 206 are received by photoacoustic generative array 203, electrical resistance can decrease as photoacoustic generative array 203 provides heat to electrical conductor 215 to increase its temperature by heat transfer from the heated photoacoustic generative array 203.

Figure 13:
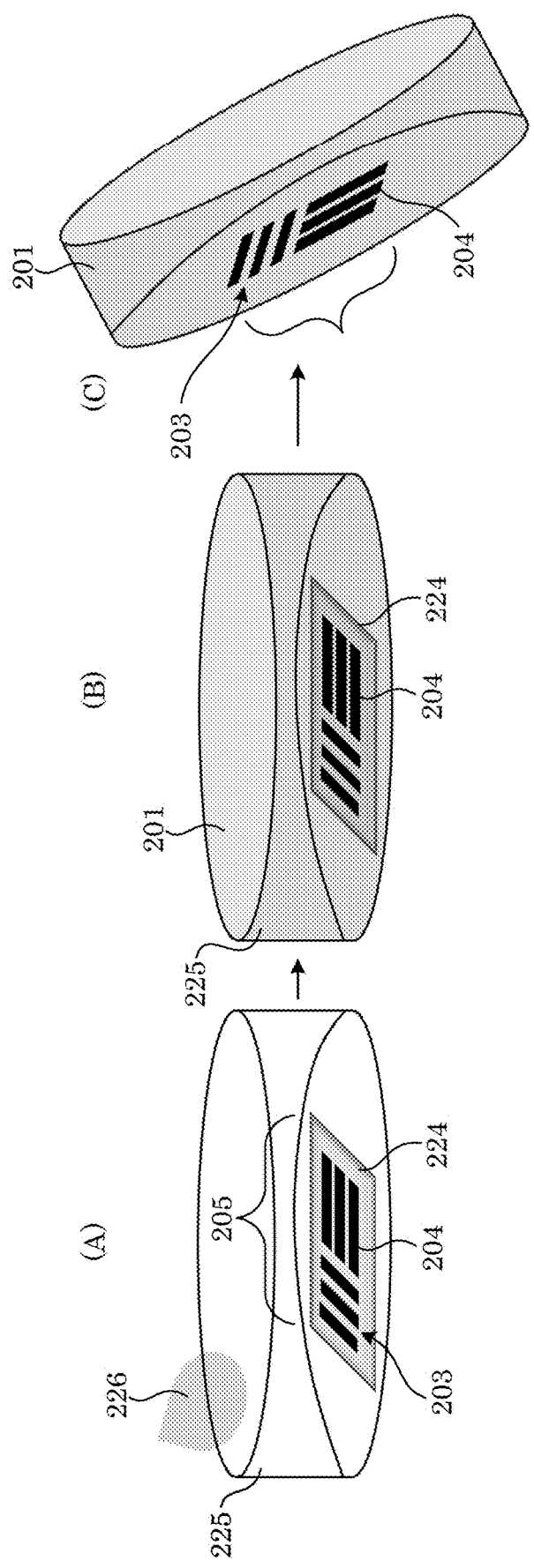
FIG. 13 shows steps in a process for making a photoacoustic photon meter that includes initial deposition of a liquid composition onto a photoacoustic generating pattern disposed on a support substrate in panel A; converting the liquid composition to a solid or gel superstratum in going from panel A to panel B; and forming the photoacoustic photon meter by lifting off a photoacoustic generative array from the support substrate onto the superstratum and removing the superstratum with transferred array in going from panel B to panel C.
Figure 14:
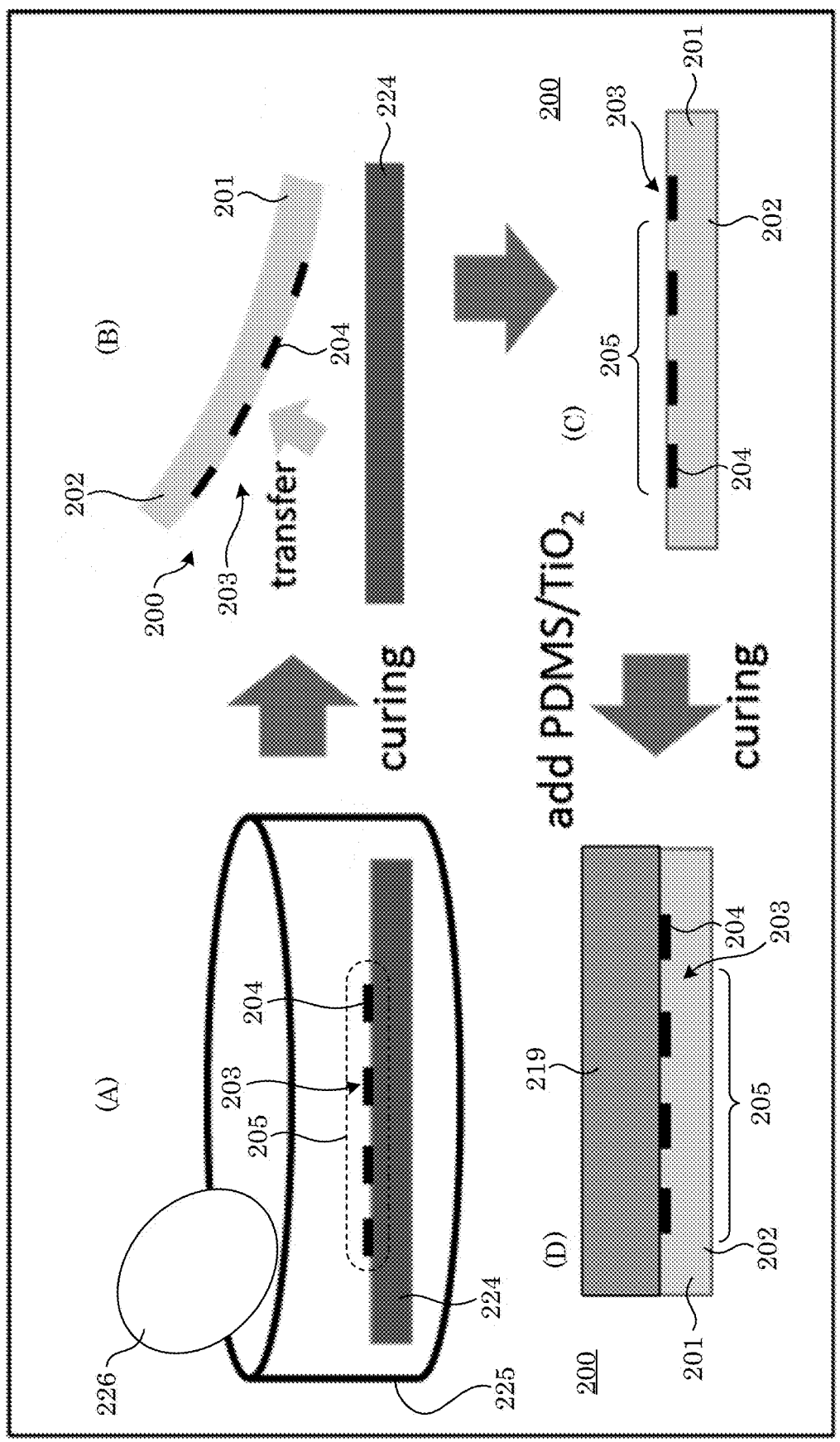
FIG. 14 shows a process making a photoacoustic photon meter that includes initial deposition of a liquid composition on a photoacoustic generating pattern disposed on a support substrate in panel A; converting the liquid composition to a solid or gel superstratum, forming the photoacoustic photon meter by lifting off a photoacoustic generative array from the support substrate onto the superstratum, and taking the superstratum with transferred array and in going from panel A to B; flipping the superstratum with the array up side down in going from panel B to C; adding another layer of superstratum with different optical properties on top of the flipped photoacoustic photon meter in going from panel C to panel D.

Photoacoustic photon meter 200 can be made in various ways. In an embodiment, with reference to FIG. 13 and FIG. 14, a process for making photoacoustic photon meter 200 includes forming photoacoustic generative array 203 on support substrate 224; disposing support substrate 224 that includes photoacoustic generative array 203 disposed thereon in container 225 (e.g., a mold or petri dish); disposing liquid composition 226 on photoacoustic generative array 203 in container 225; solidifying liquid composition 226 to form superstratum 201; and transferring, from support substrate 224, photoacoustic generative array 203 to superstratum 201 to make photoacoustic photon meter 200. With reference to FIG. 5, the process for making photoacoustic photon meter 200 can include further forming secondary substrate 219 on superstratum 201 such that photoacoustic generative array 203 is interposed between superstratum 201 and secondary substrate 219.

Forming photoacoustic generative array 203 on support substrate 224 can include drop casting a solution containing carbon nanotubes and drying, spin casting a solution containing carbon nanotubes and drying, transferring carbon nanotubes from an aqueous solution, and chemical vapor depositing carbon nanotubes with photolithographic patterning. The last approach includes photolithography in which a photoresist defines a range of patterns for selective deposition of a surface catalyst followed by lift-off of the photoresist to leave a pattern of catalyst coating on the support substrate, and growing carbon nanotubes using chemical vapor deposition selectively on the catalyst pattern.

Solidifying liquid composition 226 to form superstratum 201 can include a volume of liquid elastomeric solution included with curing reagent, wherein diisopropylamine, is poured into a petri dish that contains support substrate 224 with photoacoustic generative array 203 attached on the bottom surface of the container by an epoxy glue. The petri dish can be heated at 75° C. for 4-6 hours to solidify the liquid elastomeric polymer.

Transferring, from support substrate 224, photoacoustic generative array 203 to superstratum 201 can include oven baking, then removing the solidified elastomeric polymer out of the container and transferring photoacoustic generative array 203 from the surface of the support substrate 224 onto the bottom surface of superstratum 201.

Forming secondary substrate 219 on superstratum 201 can include, after inverting superstratum 201, disposing superstratum 201 in another container with the transferred photoacoustic generative array 203 on its top surface, pouring a volume of liquid elastomeric solution included with curing reagent thereon, and optionally repeating the process for solidifying liquid composition 226 to form superstratum 201 and transferring, from support substrate 224, photoacoustic generative array 203 to superstratum 201.

The process for making photoacoustic photon meter 200 also can include the addition of light scattering or absorbing additives including nano- and micro-particles such as titanium dioxide nanoparticles, polystyrene micro beads, silica micro beads, metal and semiconductor nanoparticles, carbon particles and spheres, carbon nanotubes, and pigment proteins such as hemoglobin, cytochrome C, and myoglobin. Inclusion of additives can be performed as follows. Additives are dispersed into a solvent, mixed with elastomeric polymer liquid, and thoroughly dispersed in the polymer liquid. The solvent is evaporated by degassing, heat can be applied. A curing reagent is added to initiate solidification. A volume of this final composition is poured into container and degassed in a vacuum chamber. The process can be repeated for solidifying liquid composition 226 to form superstratum 201 and transferring, from support substrate 224, photoacoustic generative array 203 to superstratum 201.

A process for process for measuring photon fluence with photoacoustic photon meter 200 can include the following. The experimentally measured photoacoustic pressure is proportional to the light absorption coefficient of the sample and local photon fluence irradiated onto the sample as follows:

$$P = \frac{\beta v_s^2}{C_P} \cdot \mu_a(r_T, \lambda) \cdot \Phi(r_M, \mu_s'(\lambda), \mu_a(r_M, \lambda))$$

Here, $v_s$ is the speed of sound in a medium; $\beta$ is a volume expansion coefficient; $C_P$ is an isobaric specific heat capacity; $\mu a$ is an absorption coefficient at the irradiated target position ($r_T$) at wavelength ($\lambda$) of the pulsed light; $\Phi$ is photon fluence (the number of irradiated photons per unit area of the target) that depends on the beam path ($r_M$) of the photons in the medium, wavelength-dependent reduced scattering coefficient ($\mu_s'(\lambda)$) of the medium through which the photons are transported before reaching the target, and wavelength and photon path-dependent absorption coefficient ($\mu_a(r_M, \lambda)$) of the medium. With known vs, $\beta$, $C_P$, and $\mu a$, the photon fluence at the irradiated region can be obtained from the experimentally measured pressure signal.

For high accuracy, the pressure signal and photon fluence can also be measured simultaneously. This is achieved by an experimental configuration demonstrated in FIG. 19. A pulsed laser light is irradiated through a photoacoustic transducer with a clear hole, passing the irradiating light through, at the center and onto photoacoustic generative array 203 with known $\mu_a(\lambda)$ and/or $(\mu_s'(\lambda))$. Photoacoustic pressure generated by a single laser pulse is detected by photoacoustic transducer 211. The photons irradiated onto the sample is partially transmitted through the sample which is measured by photodetector 214 placed on the opposite side. With known $\mu_a(\lambda)$ and/or $(\mu_s'(\lambda))$, the total fluence irradiated onto the sample can be back calculated by the Beer-Lambert law and/or other relevant techniques. With reference to FIG. 19, a plot of peak to peak pressure signal vs the peak photodiode signal exhibits the transmission increases as the photoacoustic signal decreases when the sample is translated to optically darker region due to increasing $\mu_a$.

Photoacoustic photon meter 200 has numerous advantages and unexpected benefits and uses. In an embodiment, a process for measuring photon fluence with photoacoustic photon meter 200 includes: receiving photons 206 by carbon nanotubes 204 in photoacoustic generative array 203 disposed on superstratum 201; producing, by carbon nanotubes 204, thermal energy 207 from optical energy 208 of photons 206; receiving, by superstratum 201, thermal energy 207 from photoacoustic generative array 203; expanding and contracting, by superstratum 201, in response to receiving thermal energy 207; and producing, by superstratum 201, photoacoustic pressure waves 209 in response to expanding and contracting of superstratum 201 to measure photon fluence of photons 206 received by photoacoustic photon meter 200, wherein photoacoustic pressure waves 209 include a photoacoustic intensity and photoacoustic frequency that are based upon an amount of optical energy applied to carbon nanotubes 204 by photons 206, a spatial photon fluence of photons 206, or a spectral photon fluence of photons 206. The process for measuring photon fluence further can include receiving, by photon propagation medium 210, photoacoustic pressure waves 209 from superstratum 201; and communicating, by superstratum 201, photoacoustic pressure waves 209 through photon propagation medium 210. The process for measuring photon fluence further can include receiving, by photoacoustic transducer 211, photoacoustic pressure waves 209 from photon propagation medium 210; and producing, by photoacoustic transducer 211, electrical signal 212 from photoacoustic pressure waves 209. The process for measuring photon fluence further can include determining, from electrical signal 212, photon fluence by converting electrical signal 212 into the photon fluence of photons 206.

Converting electrical signal 212 into photon fluence of photons 206 can include subjecting electrical signal 212 to a pressure conversion factor to obtain a photoacoustic pressure signal from electrical signal 212; and normalizing the photoacoustic pressure signal to a fluence normalization factor to obtain the photon fluence of photons 206. The fluence normalization factor can include:

$$\left(\frac{\beta v_s^2}{C_P} \cdot \mu_a(r_T, \lambda)\right)^{-1},$$

wherein $\beta v_s^2/C_p$ is a Grüneisen coefficient; $\mu_a(r_T, \lambda)$ is an absorption coefficient of carbon nanotubes 204 in photoacoustic generative array 203 of photoacoustic photon meter 200; and $\Phi(\mu_s'(r_M,\lambda), \mu_a(r_M, \lambda))$ is a photon fluence (energy per unit area), wherein $\mu_s'(r_M, \lambda)$ is a reduced scattering coefficient of the photon propagating medium; $\mu_a(r_M, \lambda)$ is an absorption coefficient of the photon propagating medium, and $\lambda$ is a wavelength of pulsed photons 206.

Figure 15:
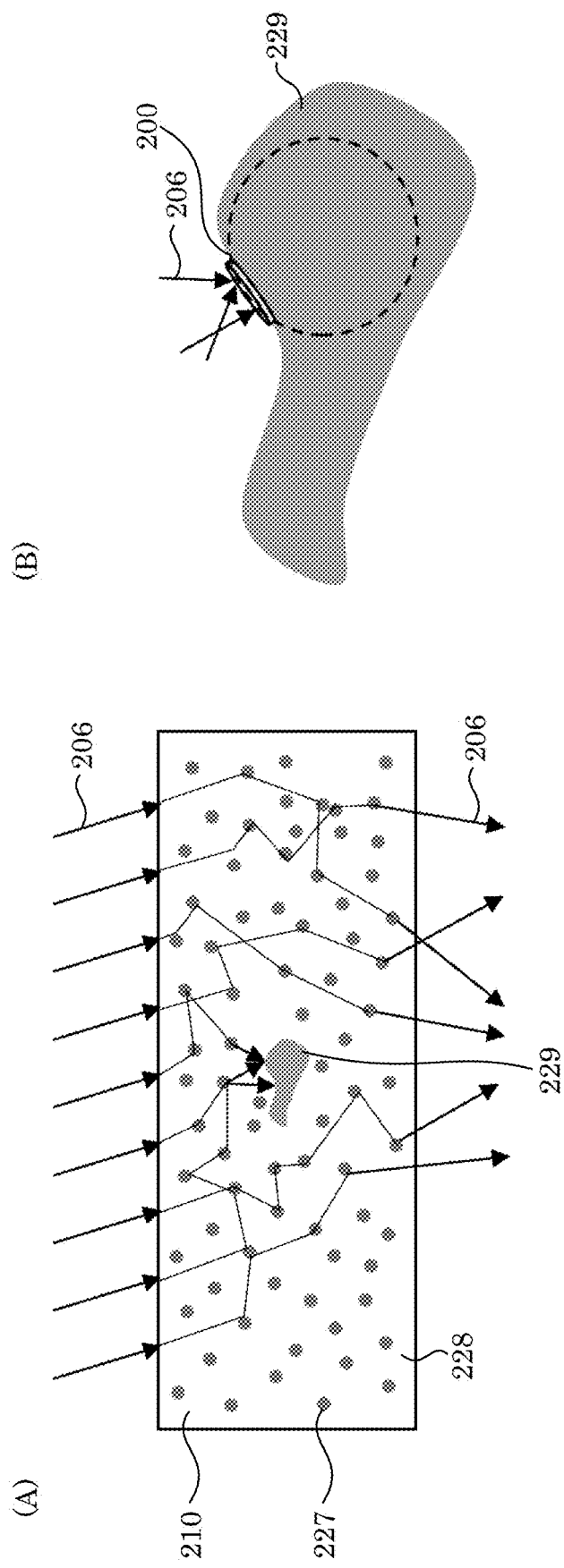
FIG. 15 shows scattering of photons in a photon propagating medium and subjecting an analyte volume disposed in the propagation medium to photons in panel A; and in panel B an enlarged view of the analyte volume on which a photoacoustic photon meter is disposed.
Figure 17:
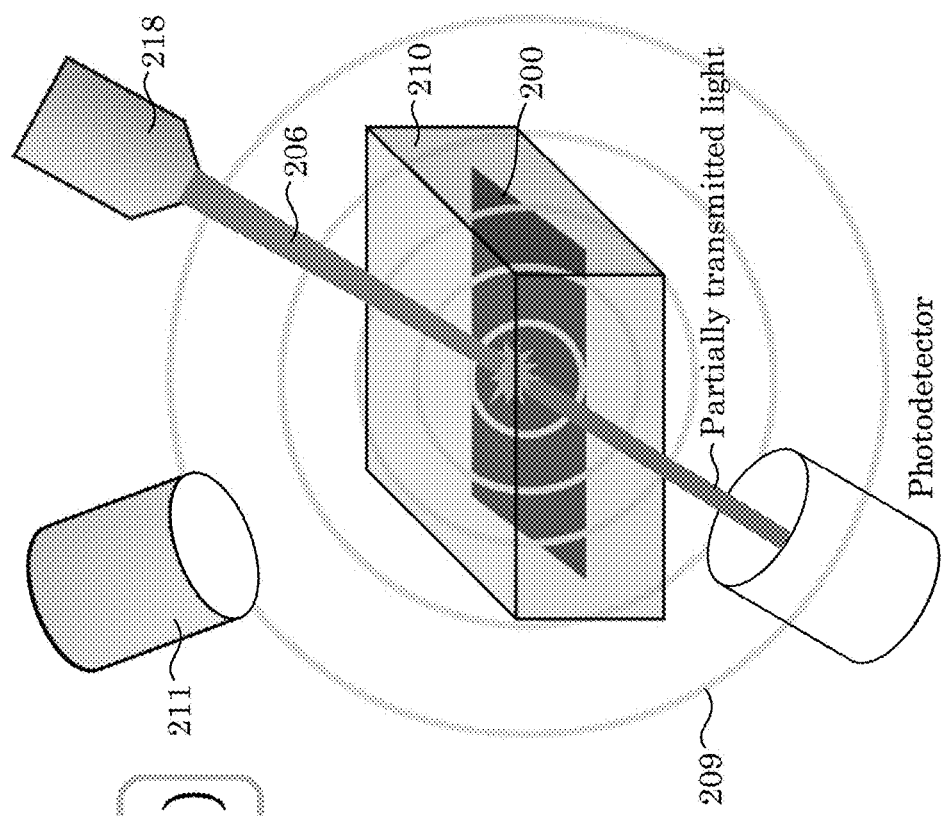
FIG. 17 shows a configuration of a photoacoustic photon meter for simultaneously determining photon fluence and acoustic pressure.

With reference to FIG. 15, it should be appreciated that propagation of photons 206 through photon propagation medium 210 that can be, e.g., a turbid medium, including optical matrix 228 in which is disposed light attenuator 227 that scatter or absorb certain photons 206, can be received by analyte volume 229. Photoacoustic photon meter 200 can be disposed on analyte volume 229 to measure an optical property, mechanical property, or thermal property by measuring photoacoustic pressure. Here, photon fluence analyte volume 229 is $\Phi=dN/dA$, wherein dN is the number of photons 206 entering into a virtual sphere of cross sectional area dA as shown in FIG. 14B.

It is contemplated that photoacoustic photon meter 200 produces a photoacoustic pressure for detection of local fluence within an optically turbid or clear medium. Photoacoustic photon meter 200 can be disposed in or on the optically turbid or clear medium. photoacoustic pressure waves 209 also is referred to as a photoacoustic pressure signal that can be detected by photoacoustic transducer 211. In an embodiment, with reference to FIG. 16, a process for performing photoacoustic imaging with photoacoustic photon meter 200 includes disposing photoacoustic photon meter 200 in photon propagation medium 210; and subjecting photoacoustic photon meter 200 with photons 206; absorbing photons 206 by carbon nanotubes 204 arranged as photoacoustic generative array 203, such that an amount of photons 206 absorbed is $$I_a I_o \cdot e^{-\mu_a z}$$

wherein $I_a$ is the amount of absorbed light energy; $I_o$ is irradiating pulsed light energy; $\mu_a$ is an absorption coefficient of the target, and z is a distance from an exterior surface of photon propagation medium 210 to photoacoustic generative array 203 of photoacoustic photon meter 200. The process of performing photoacoustic imaging also can include producing thermal energy 207 to locally heat photoacoustic generative array 203 and superstratum 201, such that a temperature change of superstratum 201 by thermal energy 207 is $$\Delta T = \alpha \cdot \frac{\Delta P}{P},$$

wherein $\alpha$ is an experimentally determined material-dependent constant, $\Delta P$ is the pressure rise when the temperature rise by $\Delta T$. The process of performing photoacoustic imaging also can include thermoelastically expanding superstratum 201 in response to receiving thermal energy 207 from photoacoustic generative array 203, such that the change in the volume V of superstratum 201 after expansion is $V=V_0(\beta\Delta T)$, wherein $V_0$ is the initial volume, and $\beta$ is a thermal expansion coefficient of superstratum 201. The process of performing photoacoustic imaging also can include contracting superstratum 201 and generating photoacoustic pressure waves 209 as ultrasound pressure P such that $P=(\rho v_s^2)(\beta\Delta T)$, wherein $v_s$ is the speed of sound in the photon propagation medium 210.

In an embodiment, with reference to FIG. 16, a process for determining photon fluence and acoustic pressure with photoacoustic photon meter 200 includes disposing photoacoustic photon meter 200 in photon propagation medium 210; and subjecting photoacoustic photon meter 200 with photons 206; absorbing photons 206 by carbon nanotubes 204 arranged as photoacoustic generative array 203; producing photoacoustic pressure waves 209 in response to receiving photons 206 by photoacoustic generative array 203 via receipt of thermal energy 207 by superstratum 201; receiving photoacoustic pressure waves 209 by photoacoustic transducer 211 from photoacoustic pressure waves 209; producing electrical signal 212 from photoacoustic pressure waves 209 by photoacoustic transducer 211; and converting electrical signal 212 to obtain an acoustic pressure P of thermal energy 207, such that $$P = \frac{\beta v_s^2}{C_P} \cdot \mu_a(r_T, \lambda) \cdot \Phi(r_M, \mu_s'(\lambda), \mu_a(r_M, \lambda)),$$

wherein $\beta v_s^2/C_\rho$ is a Grüneisen coefficient; $\mu_a(r_T, \lambda)$ is an absorption coefficient of carbon nanotubes 204 in photoacoustic generative array 203 of photoacoustic photon meter 200; and $\Phi(\mu'_s(r_M, \lambda), \mu_a(r_M, \lambda))$ is a photon fluence (energy per unit area), wherein $\lambda'_s(r_M, \lambda)$ is a reduced scattering coefficient of the photon propagating medium; $\mu_a(r_M, \lambda)$ is an absorption coefficient of the photon propagating medium, and λ is a wavelength of pulsed photons 206.

Photoacoustic photon meter 200 and processes disclosed herein have numerous beneficial uses, including accurate measurement of photon fluence in a turbid medium, accurate performance testing of photoacoustic transducers, development of ultrasound sources with controlled pressure characteristics. Photoacoustic photon meter 200 and processes disclosed herein provide information for a mechanism of photonic to thermal or mechanical energy conversion. Advantageously, photoacoustic photon meter 200 overcomes limitations of technical deficiencies of conventional compositions and conventional articles such as a lack of conventional measurement technologies and standards that provide accurate local photon fluence, temperature, and pressure measurements in turbid media. In a light-diffusing or light-absorbing material, accurate local photon fluence measurement is challenging. In a turbid medium, scattered photons dominate and the photon fluence is heterogeneous in the bulk due to variations in the local intensity and scattering angle of the photons. Conventional photon detection sensors such as photomultipliers or photodiodes fail to accurately measure local photon fluence because of unknown reflectance at or near the sensor surface and wavelength-dependent spectral responsivity of the conventional sensor. Moreover, conventional articles are hard to embed in a bulk material. Photoacoustic photon meter 200 overcomes these limitations and has a known absorption coefficient that can be selectively fabricated into a desired shape and disposed in an optically turbid or clear medium or placed on an exposed surface thereof. Further, photoacoustic photon meter 200 measures local photon fluence for quantitative optical imaging of biological tissues, local temperature fluctuations in turbid materials during photothermal therapy that kills tumor cells by light illumination. Photoacoustic photon meter 200 can calibrate measurement results by photonic and optoelectronic devices in a turbid environment and provide resolution and photon fluence measurement targets. Photoacoustic photon meter 200 can have a small variation in absorption efficiency across a broad wavelength range so that photoacoustic photon meter 200 can be a calibration tool for quantitative multispectral measurements in a variety of optical imaging applications including optical microscopy, optical coherence tomography, photoacoustic microscopy, computed tomography, multispectral imaging, and the like as well as non-imaging calibration of an ultrasound transducer or thermometer.

Photoacoustic photon meter 200 and processes herein unexpectedly measure delivered photon fluence through photoacoustic pressure. Conventional photon detection sensors such as photomultipliers or photodiodes can be inadequate to measure the local photon fluence in a scattering medium due to unknown reflectance at or near the sensor surface and wavelength dependent spectral responsivity of a conventional sensor. Moreover, conventional sensors can be difficult to embed in a bulk material. Beneficially, photoacoustic photon meter 200 includes carbon nanotubes with known absorption coefficient and can be fabricated into a selected shape that can be disposed in an optically turbid or clear medium and, upon being illuminated by a pulsed light source (e.g., laser or light emitting diode, LED), photoacoustic photon meter 200 produces photoacoustic pressure that is detected and used to determine local photon fluence. Moreover, photoacoustic photon meter 200 provides quantitative evaluation of performance of photoacoustic imaging devices and can be provided in a format such as a resolution target for spatial resolution evaluation or a calibrated spectral response analyzer for quantitative multispectral measurements.

The articles and processes herein are illustrated further by the following Examples, which are non-limiting.

EXAMPLES

Example 1

Determination of Photoacoustic Pressure

Figure 18:
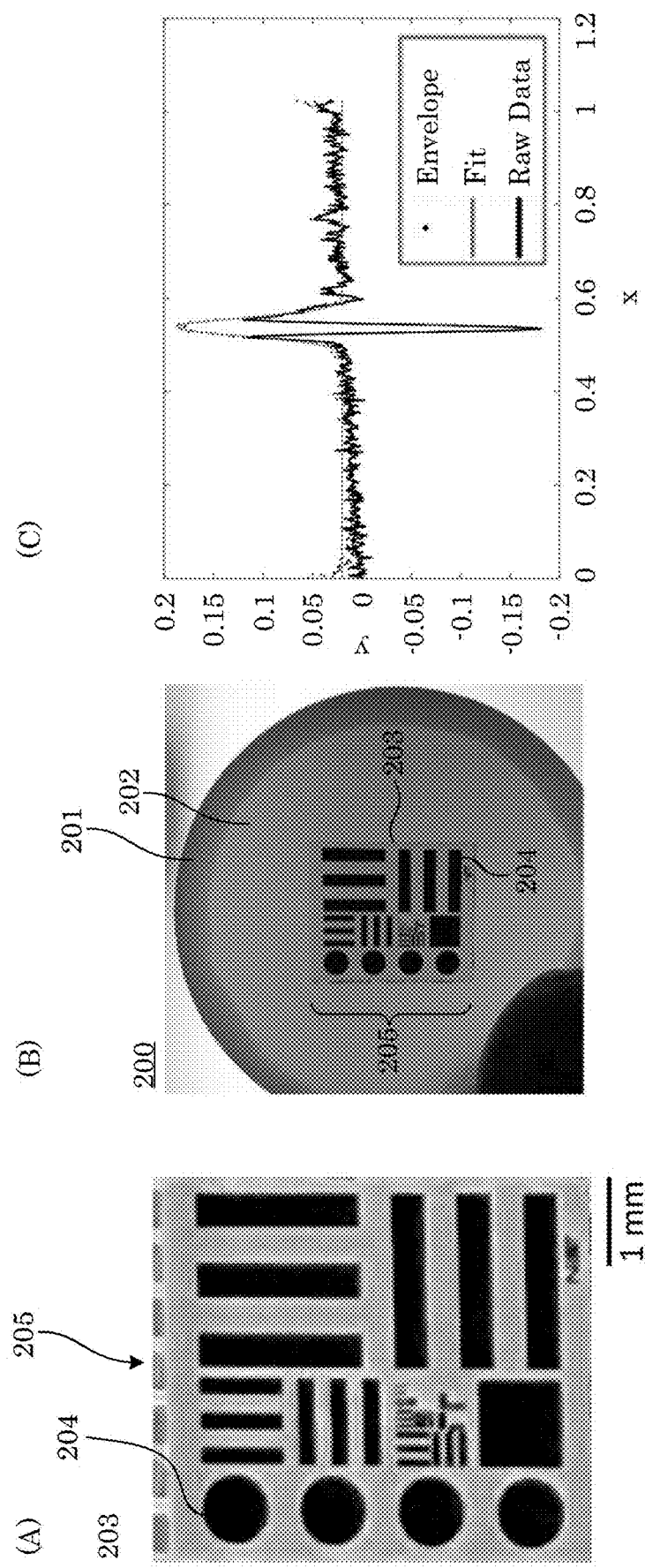
FIG. 18 shows a photoacoustic generative array on a support substrate before transferring to a superstratum in panel A; in panel B a photoacoustic photon meter that includes the photoacoustic generative array shown in panel A with superstratum; and in panel C a graph of acoustic pressure versus time obtained by a photoacoustic transducer in the reflection position to measure the pressure from the photoacoustic photon meter shown in panel B.

With reference to FIG. 18, photoacoustic photon meter 200 was made by growing CNTs vertically on a silicon substrate by chemical vapor deposition on patterns predefined by photolithography and transferring the patterned CNTs to a PDMS substrate as described previously. Photoacoustic photon meter 200 included transferred CNT patterns on a PDMS superstratum, wherein patterns were various shapes that included lines, rectangles, and discs with various sizes from a few micrometers to a few millimeters.

Photoacoustic photon meter 200 was subjected to photons 206, from which superstratum 201 produced photoacoustic pressure waves 209. FIG. 18C shows a graph of acoustic pressure versus time for raw data of photoacoustic pressure waves 209 from photoacoustic generating pattern 205 upon irradiating photoacoustic generative array 203 with a single laser pulse of photons 206 that had wavelength 532 nm, pulse width 11 ns, and peak pulse energy 20 nJ that were focused onto a Gaussian spot size of 2.5 μm in diameter, a full width of 1/e maximum of a Gaussian profile. Photoacoustic pressure waves 209 were received by a 50 MHz bandwidth ultrasound transducer as photoacoustic transducer 211.

Example 2

Simultaneous Determination of Photoacoustic Pressure and Photon Fluence

Photoacoustic photon meter 200 can be a standard such as a calibrated spectral response analyzer for quantitative multispectral measurements or a multispectral radiometer to measure wavelength-dependent photon transport in turbid medium. Here, measured photoacoustic pressure is proportional to a light absorption coefficient of a sample and local photon fluence irradiated onto the sample. Photon fluence at an irradiated region can be obtained from measured pressure signal. For high accuracy, the acoustic pressure signal and photon fluence are measured simultaneously. With reference to FIG. 19, light source 218 produces a pulsed laser light as photons 206 that propagate through photoacoustic transducer 211 with an open aperture, allowing for passing the irradiating light through, at its center. Photons 206 are received by photoacoustic generative array 203 disposed on superstratum 201 of photoacoustic photon meter 200 with known $\mu_a(\lambda)$ or $(\mu_s'(\lambda)$. Photoacoustic pressure waves 209 provide photoacoustic pressure generated from a single laser pulse and that is detected by photoacoustic transducer 211. Photons 206 irradiated onto photoacoustic photon meter 200 are partially transmitted through photoacoustic photon meter 200 and measured by photodetector 214 disposed opposing photoacoustic photon meter 200. With known $\mu_a(\lambda)$ or $(\mu_s'(\lambda)$, the total fluence irradiated on photoacoustic photon meter 200 is calculated using the Beer-Lambert law or another technique. FIG. 18B shows time-traced photoacoustic pressure signals obtained from different regions of photoacoustic generative array 203 of photoacoustic photon meter 200 that had different $\mu_a$. FIG. 18C shows a time-traced photon transmission signal obtained from different regions of photoacoustic generative array 203 with different $\mu_a$. FIG. 19D shows a graph of peak-to-peak pressure signal versus peak photodiode signal exhibited a transmission increase as photoacoustic signal decreased as photoacoustic photon meter 200 was translated to an optically darker region that had a greater $\mu_a$.

Example 3

CNT-Based Sensor for Simultaneous Temperature and Fluence Measurements

Figure 11:
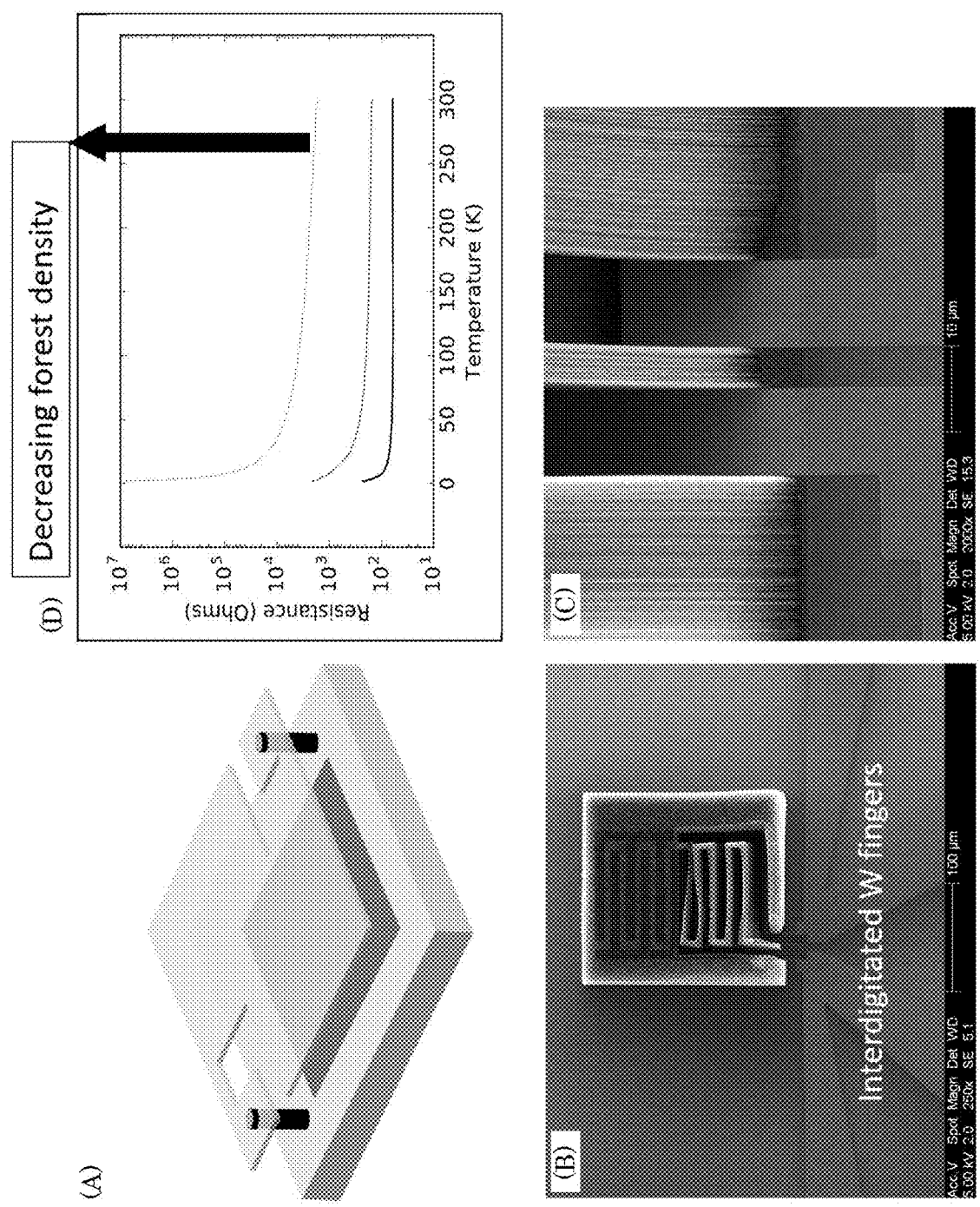
FIG. 11 shows a photoacoustic photon meter configured for measurement of temperature and photon fluence in panel A; a scanning electron micrograph of the photoacoustic photon meter without an optical window on the photoacoustic photon meter in panel B; an expanded view of the photoacoustic power meter in panel C; and a graph of resistance versus temperature for a photoacoustic photon meter in panel D.

In photoacoustic photon meter 200, upon irradiation, absorbed photons increase a local temperature of photoacoustic photon meter 200, resulting in change of electrical resistivity or conductivity of carbon nanotubes 204 in photoacoustic generative array 203. Therefore, photoacoustic photon meter 200 with photoacoustic generating pattern 205 disposed on superstratum 201 and arranged in a selected configuration provides a local temperature sensor. Accordingly, photoacoustic photon meter 200 was configured as a thermistor in an integrated device. Lithography and chemical vapor deposition (CVD) provided patterning of CNTs on a micrometer scale on a support. Electrical conductors were attached to photoacoustic generating pattern 205 to monitor change in electrical resistivity or conductivity by absorbed photons from a pulsed light source with measurements made by a 4-probe measurement technique. FIG. 11 shows a CNT photoacoustic generating pattern 205 in a photoacoustic generative array 203 deposited on a silicon or vanadium oxide substrate configured as a microbolometer for measuring electrical resistivity in response to temperature change. This device can be modified for photoacoustic measurements by including an optically transparent window below the CNT pattern for optical transmission measurement and encapsulation of the device with PDMS superstratum 201 for effective photoacoustic signal generation of photoacoustic pressure waves 209 in photon propagation medium 210 such as water. Photoacoustic photon meter 200 can be water-proofed for resistivity or conductivity measurements.

FIG. 19 shows a graph of resistance versus temperature for vertically aligned CNTs in photoacoustic generative array 203. It should be appreciated that changes in simultaneously measured ultrasound pressure and electrical resistance or resistivity with known emission energy of the light source provide a calibration curve of the fluence versus electrical conductivity. The fluence versus ultrasound pressure obtained by the method described can provide a calibration curve of the fluence versus ultrasound pressure. These two calibration curves for the pressure, photon fluence, and electrical conductivity, by inter-relating them, provide for readily obtaining one value from the others.

Example 4

Dimensional Calibration with a Resolution Standard

Figure 20:
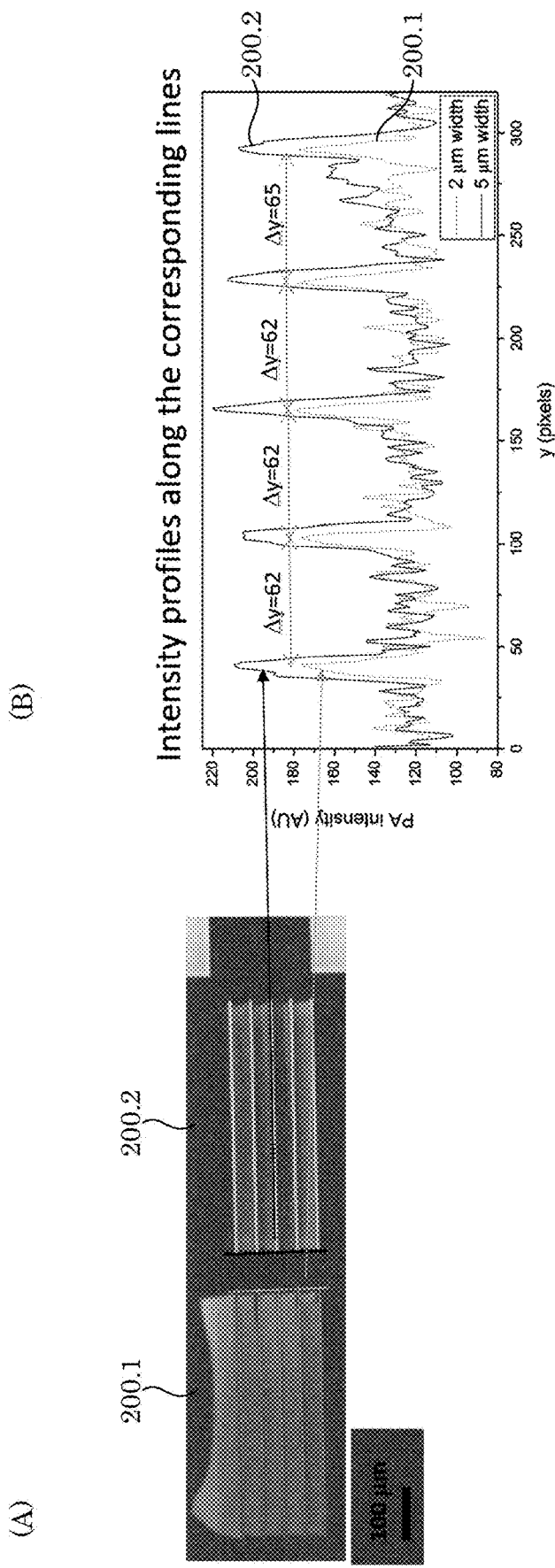
FIG. 20 shows a plurality of micrometer scale photoacoustic photon meters for resolution calibration in panel A; and in panel B a graph of photoacoustic intensity along a line across the plurality of the photoacoustic photon meters shown in panel A for resolution analysis.

A resolution standard was made by vertically growing CNTs on a silicon wafer by lithography and chemical vapor deposition technique, followed by transferring the CNT patterns to the surface of PDMS, where pattern consists of a group of 2 micrometer width lines and 4 micrometer width lines, where lines are separated by a 20 micrometer distance. The resolution standard is shown in FIG. 20. The resolution standard was irradiated with pulsed laser of photons 206 that had wavelength 532 nm, pulse width 11 ns, and peak pulse energy 20 nJ that were focused onto a Gaussian spot size of 2.5 μm in diameter. Photoacoustic pressure waves 209 were received by a 50 MHz bandwidth ultrasound transducer as photoacoustic transducer 211 while raster scanning the sample to produce a 2D photoacoustic pressure signal image shown in FIG. 20(A), and from this image intensity profiles along the indicated lines over the image were plotted in FIG. 20(B). This can be used to calibrate the raster scanner and determine the resolution of the phoatoacoustic imaging device.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like.

As used herein, "a combination thereof" refers to a combination comprising at least one of the named constituents, components, compounds, or elements, optionally together with one or more of the same class of constituents, components, compounds, or elements.

All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." It should further be noted that the terms "first," "second," "primary," "secondary," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity). The conjunction "or" is used to link objects of a list or alternatives and is not disjunctive; rather the elements can be used separately or can be combined together under appropriate circumstances.

What is claimed is:

1. A photoacoustic photon meter comprising:
 a photoacoustic generative array comprising a plurality of carbon nanotubes disposed in a photoacoustic generating pattern, such that the carbon nanotubes:
  receive photons comprising optical energy, and
  produce thermal energy from the optical energy; and
 a superstratum comprising a thermally expandable elastomer on which the photoacoustic generative array is fixedly disposed in position on the superstratum to spatially conserve the photoacoustic generating pattern, and such that the superstratum:
  is optically transparent to the photons;
  receives the thermal energy from the photoacoustic generative array;
  expands and contracts in response to receipt of the thermal energy; and
  produces photoacoustic pressure waves in response to the expansion and contraction, the photoacoustic pressure waves comprising a photoacoustic intensity and photoacoustic frequency that are based upon an amount of optical pressure applied to the carbon nanotubes by the photons, a spatial photon fluence of the photons, or a spectral photon fluence of the photons.

2. The photoacoustic photon meter of claim 1, further comprising:
 a photon propagation medium disposed on the superstratum and in photoacoustic communication with the superstratum and that:
  receives the photoacoustic pressure waves from the superstratum; and
  communicates the photoacoustic pressure waves through the photon propagation medium.

3. The photoacoustic photon meter of claim 2, further comprising:
 a photoacoustic transducer in photoacoustic communication with the photon propagation medium and the superstratum and that:
  receives the photoacoustic pressure waves from the photon propagation medium; and
  produces electrical signal from the photoacoustic pressure waves and from which the optical fluence of the photons can be determined.

4. The photoacoustic photon meter of claim 3, further comprising:
 a plurality of electrical conductors disposed on the superstratum with the photoacoustic generative array deposited on the electrical conductors, such that the electrical conductors are in thermal contact with the photoacoustic generative array.

5. The photoacoustic photon meter of claim 3, further comprising a photodetector in optical communication with the photoacoustic generative array and the superstratum and that receives photons transmitted through the photoacoustic generative array and the superstratum.

6. The photoacoustic photon meter of claim 1, wherein the photoacoustic generating pattern is discontinuous so that the photoacoustic generating pattern comprises a plurality of laterally or axially non-contacting portions.

7. The photoacoustic photon meter of claim 1, wherein the photoacoustic generating pattern is continuous in an absence of a discontinuity among the carbon nanotubes in the photoacoustic generating pattern.

8. The photoacoustic photon meter of claim 1, wherein the carbon nanotubes are aligned with respect to each other.

9. The photoacoustic photon meter of claim 1, wherein the carbon nanotubes are randomly arranged or bundled with respect to each other.

10. The photoacoustic photon meter of claim 1, wherein the carbon nanotubes in the photoacoustic generating pattern are arranged spatially and provide different portions of the photoacoustic generating pattern to have a different optical absorption coefficient $\mu_a$ and reduced scattering coefficient $\mu_s'$.

11. The photoacoustic photon meter of claim 1, wherein the thermally expandable elastomer comprises polydimethylsiloxane.

12. The photoacoustic photon meter of claim 2, wherein the photon propagation medium comprises water.

13. The photoacoustic photon meter of claim 3, wherein the photoacoustic transducer comprises a hydrophone.

14. A process for measuring photon fluence with the photoacoustic photon meter of claim 1, the process comprising:
 receiving photons by the carbon nanotubes in the photoacoustic generative array disposed on the superstratum;
 producing, by the carbon nanotubes, thermal energy from the optical energy of the photons;
 receiving, by the superstratum, the thermal energy from the photoacoustic generative array;
 expanding and contracting, by the superstratum, in response to receiving the thermal energy; and
 producing, by the superstratum, photoacoustic pressure waves in response to expanding and contracting of the superstratum to measure the photon fluence of the photons received by the photoacoustic photon meter,
 wherein the photoacoustic pressure waves comprise a photoacoustic intensity and photoacoustic frequency that are based upon an amount of optical pressure applied to the carbon nanotubes by the photons, a spatial photon fluence of the photons, or a spectral photon fluence of the photons.

15. The process for measuring photon fluence of claim 14, further comprising:
 receiving, by the photon propagation medium, the photoacoustic pressure waves from the superstratum; and
 communicating, by the superstratum, the photoacoustic pressure waves through the photon propagation medium.

16. The process for measuring photon fluence of claim 15, further comprising:
 receiving, by the photoacoustic transducer, the photoacoustic pressure waves from the photon propagation medium; and
 producing, by the photoacoustic transducer, an electrical signal from the photoacoustic pressure waves.

17. The process for measuring photon fluence of claim 16, further comprising determining, from the electrical signal, the photon fluence by converting the electrical signal into the photon fluence of the photons.

18. The process for measuring photon fluence of claim 17, wherein converting the electrical signal into the photon fluence of the photons comprises:
subjecting the electrical signal to a pressure conversion factor to obtain a photoacoustic pressure signal from the electrical signal; and
normalizing the photoacoustic pressure signal to a fluence normalization factor to obtain the photon fluence of the photons.

19. The process for measuring photon fluence of claim 18, wherein the fluence normalization factor comprises:

$$\left(\frac{\beta v_s^2}{C_P} \cdot \mu_a(r_T, \lambda)\right)^{-1},$$

wherein $v_s$ is the speed of sound in the superstratum; $\beta$ is a volume expansion coefficient of the superstratum; $C_P$ is isobaric specific heat of photoacoustic generative array; $\mu_a$ is an absorption coefficient of the photoacoustic generative array of the photoacoustic generating pattern irradiated by the photons at a position $r_T$ at a wavelength $\lambda$ of photons.

20. A process for measuring a local temperature rise with the photoacoustic photon meter of claim 1, the process comprising:
receiving photons by the carbon nanotubes in the photoacoustic generative array deposited on a plurality of electrical conductors that is in thermal contact at the interface;
increasing a temperature of the photoacoustic generative array upon receiving photons by the carbon nanotubes;
measuring an electrical voltage across a first pair of electrical conductors of the plurality of electrical conductors while applying an electrical current across a second pair of electrical conductors of the plurality of electrical conductors;
producing a current versus voltage curve from the electrical voltage and the electrical current;
determining the electrical resistance from the current versus voltage curve; and
obtaining the local temperature change from temperature-dependent electrical conductivity changes.

* * * * *